United States Patent
Nishimoto et al.

(10) Patent No.: US 9,923,486 B2
(45) Date of Patent: Mar. 20, 2018

(54) ELECTRIC POWER CONVERSION CIRCUIT INCLUDING SWITCHES AND BOOTSTRAP CIRCUITS, AND ELECTRIC POWER TRANSMISSION SYSTEM INCLUDING ELECTRIC POWER CONVERSION CIRCUIT

(71) Applicant: Panasonic Intellectual Property Management Co., Ltd., Osaka (JP)

(72) Inventors: Taiki Nishimoto, Osaka (JP); Atsushi Yamamoto, Kyoto (JP); Shoichi Hara, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/590,090

(22) Filed: May 9, 2017

(65) Prior Publication Data
US 2017/0346415 A1  Nov. 30, 2017

(30) Foreign Application Priority Data

May 26, 2016  (JP) ................................. 2016-105498

(51) Int. Cl.
*H02M 7/538* (2007.01)
*H02M 7/53862* (2007.01)
*H02M 7/5387* (2007.01)
*H02M 7/5395* (2006.01)

(52) U.S. Cl.
CPC ..... *H02M 7/53862* (2013.01); *H02M 7/5387* (2013.01); *H02M 7/5395* (2013.01)

(58) Field of Classification Search
CPC ........... H02M 7/5387; H02M 7/53862; H02M 7/5395; H02M 1/32; H02M 1/34; H02M 1/38; H02M 1/40; H02M 3/3376; H02M 3/33507; H02M 3/33523; H02M 3/33563; H02M 3/33569
USPC ........... 363/56.02–56.08, 131, 132, 135, 136
See application file for complete search history.

(56) References Cited

U.S. PATENT DOCUMENTS

| | | | | |
|---|---|---|---|---|
| 2005/0162870 A1* | 7/2005 | Hirst | ..................... | H02M 1/083 363/16 |
| 2012/0230067 A1* | 9/2012 | Yamanaka | ............. | H02M 5/293 363/37 |
| 2012/0250375 A1* | 10/2012 | Satou | ..................... | H02M 7/538 363/37 |

(Continued)

FOREIGN PATENT DOCUMENTS

| | | |
|---|---|---|
| JP | 2005-210894 | 8/2005 |
| JP | 2010-035387 | 2/2010 |
| JP | 2011-151872 | 8/2011 |

(Continued)

*Primary Examiner* — Yemane Mehari
(74) *Attorney, Agent, or Firm* — McDermott Will & Emery LLP

(57) ABSTRACT

An electric power conversion circuit includes: first through fourth port terminals; first through fourth switches that are connected with each other in a bridge configuration; fifth through eighth switches that are respectively connected in parallel with the first through fourth switches; first through eighth diodes that are respectively connected in series with the first through eighth switches; a first bootstrap circuit that is connected to control terminals of the first, second, fourth, and sixth switches; and a second bootstrap circuit that is connected to control terminals of the third, fifth, seventh, and eighth switches.

16 Claims, 21 Drawing Sheets

(56) References Cited

U.S. PATENT DOCUMENTS

2013/0082516 A1* 4/2013 Yamaguchi ............... H02J 4/00
　　　　　　　　　　　　　　　　　　　　　307/1
2017/0345808 A1* 11/2017 Nishimoto .............. H01L 27/02

FOREIGN PATENT DOCUMENTS

| JP | 2012-186924 | 9/2012 |
|----|-------------|--------|
| JP | 2013-085445 | 5/2013 |

* cited by examiner

ELECTRIC POWER CONVERSION CIRCUIT INCLUDING SWITCHES AND BOOTSTRAP CIRCUITS, AND ELECTRIC POWER TRANSMISSION SYSTEM INCLUDING ELECTRIC POWER CONVERSION CIRCUIT

BACKGROUND

1. Technical Field

The present disclosure relates to an electric power conversion circuit and an electric power transmission system in which electric power is transmitted from a power source to a load through an electric power line by using the electric power conversion circuit as an electric power transmitting device or an electric power receiving device.

2. Description of the Related Art

In recent years, renewable energy represented by solar power, wind power, biofuel power, and the like is increasingly introduced in addition to conventional electric power such as thermal power, hydropower, and nuclear power provided by electric power companies. Furthermore, in addition to existing large-scale commercial electric power networks, introduction of local small-scale electric power networks that enable local production for local consumption of electric power is spreading throughout the world for the purpose of reducing loss during long-distance electric power transmission.

Most renewable energy sources connected to such local small-scale electric power networks are inferior in power generation capability to and is larger in fluctuation of power generation capability than main power sources of the conventional large-scale commercial electric power networks. Therefore, in order to achieve stable and efficient operation of a small-scale electric power network, a technique that allows electric power interchange by selecting a transmission route through which electric power can be transmitted and received with high use efficiency is needed.

Japanese Unexamined Patent Application Publication No. 2010-035387 and Japanese Unexamined Patent Application Publication No. 2005-210894 disclose conventional electric power conversion circuits.

SUMMARY

In one general aspect, the techniques disclosed here feature an electric power conversion circuit including a first port terminal; a second port terminal; a third port terminal; a fourth port terminal; a first diode that allows a first electric current to flow from the first port terminal to the third port terminal; a second diode that allows a second electric current to flow from the third port terminal to the second port terminal; a third diode that allows a third electric current to flow from the first port terminal to the fourth port terminal; a fourth diode that allows a fourth electric current to flow from the fourth port terminal to the second port terminal; a fifth diode that allows a fifth electric current to flow from the third port terminal to the first port terminal; a sixth diode that allows a sixth electric current to flow from the second port terminal to the third port terminal; a seventh diode that allows a seventh electric current to flow from the fourth port terminal to the first port terminal; an eighth diode that allows an eighth electric current to flow from the second port terminal to the fourth port terminal; a first switch through which the first electric current flows when the first switch is on, the first switch including a first control terminal and being connected in series with the first diode; a second switch through which the second electric current flows when the second switch is on, the second switch including a second control terminal and being connected in series with the second diode; a third switch through which the third electric current flows when the third switch is on, the third switch including a third control terminal and being connected in series with the third diode; a fourth switch through which the fourth electric current flows when the fourth switch is on, the fourth switch including a fourth control terminal and being connected in series with the fourth diode; a fifth switch through which the fifth electric current flows when the fifth switch is on, the fifth switch including a fifth control terminal and being connected in series with the fifth diode; a sixth switch through which the sixth electric current flows when the sixth switch is on, the sixth switch including a sixth control terminal and being connected in series with the sixth diode; a seventh switch through which the seventh electric current flows when the seventh switch is on, the seventh switch including a seventh control terminal and being connected in series with the seventh diode; an eighth switch through which the eighth electric current flows when the eighth switch is on, the eighth switch including an eighth control terminal and being connected in series with the eighth diode; a first bootstrap circuit that includes a first voltage source and is connected to the first, second, fourth, and sixth control terminals; and a second bootstrap circuit that includes a second voltage source and is connected to the third, fifth, seventh, and eighth control terminals.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

First, underlying knowledge forming the basis of the present disclosure is described.

Figure 15:
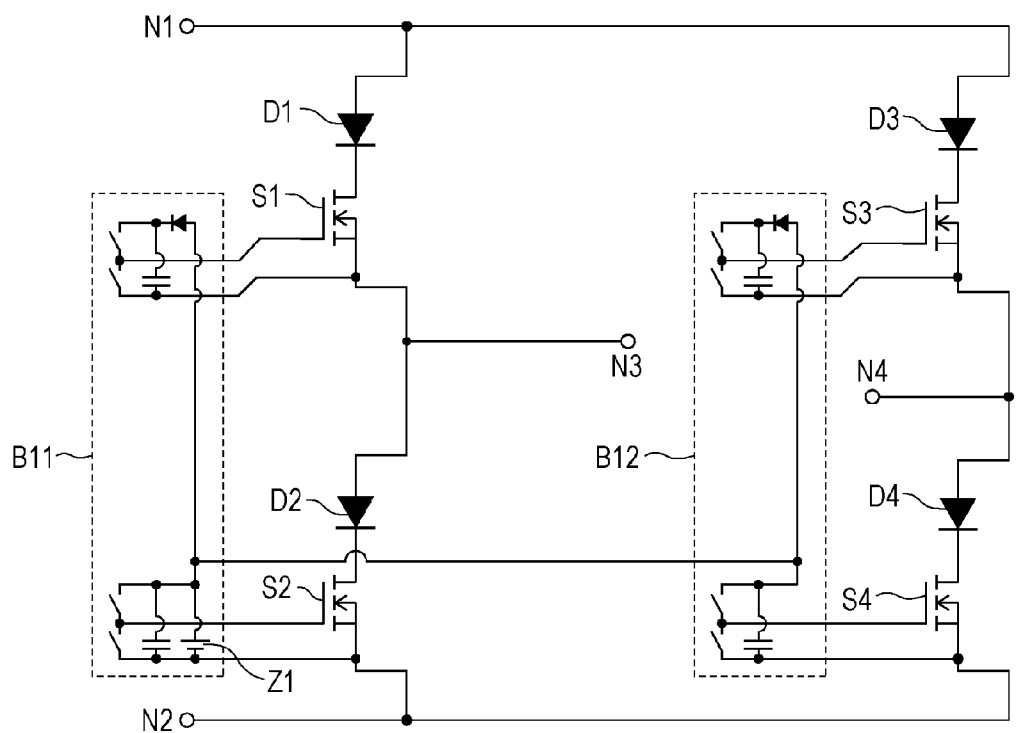
FIG. 15 is a circuit diagram illustrating a configuration of an inverter circuit according to a first comparative example.

FIG. 15 is a circuit diagram illustrating a configuration of an inverter circuit according to a first comparative example that converts direct-current electric power input from port terminals N1 and N2 into alternating-current electric power and then outputs the alternating-current electric power from port terminals N3 and N4. The inverter circuit illustrated in FIG. 15 includes four diodes D1 through D4, four switches S1 through S4, and two bootstrap circuits B11 and B12. The switches S1 through S4 are N-channel MOSFETs. The four switches S1 through S4 are driven by the bootstrap circuits B11 and B12.

Figure 16:
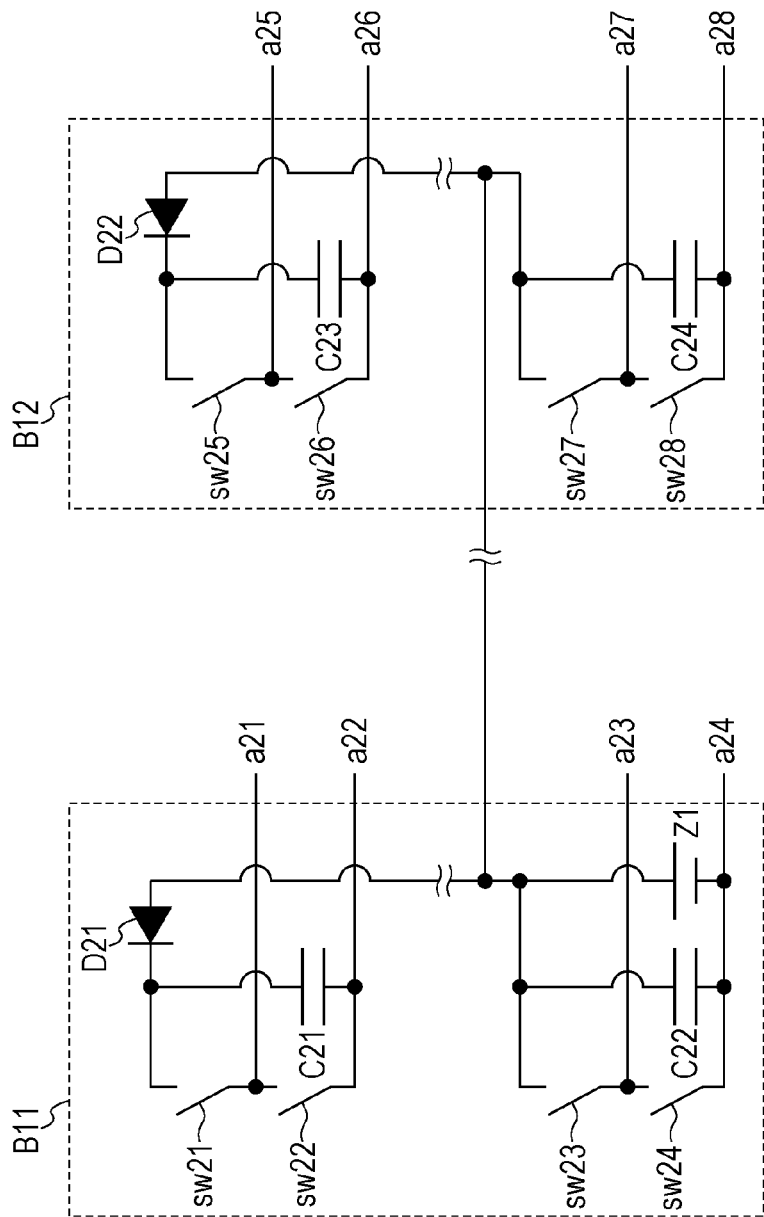
FIG. 16 is a circuit diagram illustrating a configuration of a bootstrap circuit according to the first comparative example.

FIG. 16 is a circuit diagram illustrating a configuration of the bootstrap circuits B11 and B12 illustrated in FIG. 15. The bootstrap circuit B11 includes capacitors C21 and C22, a diode D21, and switches sw21 through sw24. The bootstrap circuit B12 includes capacitors C23 and C24, a diode D22, and switches sw25 through sw28. An isolated power source Z1 is provided in one of the bootstrap circuits B11 and B12, and a voltage of the isolated power source Z1 is applied to the capacitors C21 through C24. Terminals a21 and a22, terminals a23 and a24, terminals a25 and a26, and terminals a27 and a28 constitute four pairs of output terminals of the bootstrap circuits B11 and B12. The terminal a21 is connected to a gate of the switch S1, and the terminal a22 is connected to a source of the switch S1. When the switch sw21 is turned on, a voltage of the capacitor C21 is applied to the gate of the switch S1. When the switch sw22 is turned on, the gate of the switch S1 is reset. Other parts of the bootstrap circuits B11 and B12 are connected to the switches S2 through S4 in a similar manner, and voltages of the capacitors C22 through C24 are applied to gates of the switches S2 through S4.

In the inverter circuit illustrated in FIG. 15, the four switches S1 through S4 are driven by the single isolated power source Z1. Accordingly, the first switch S1 and the second switch S2 are driven by the first bootstrap circuit B11 having two pairs of output terminals. Furthermore, the third switch S3 and the fourth switch S4 are driven by the second bootstrap circuit B12 having two pairs of output terminals.

Figure 17:
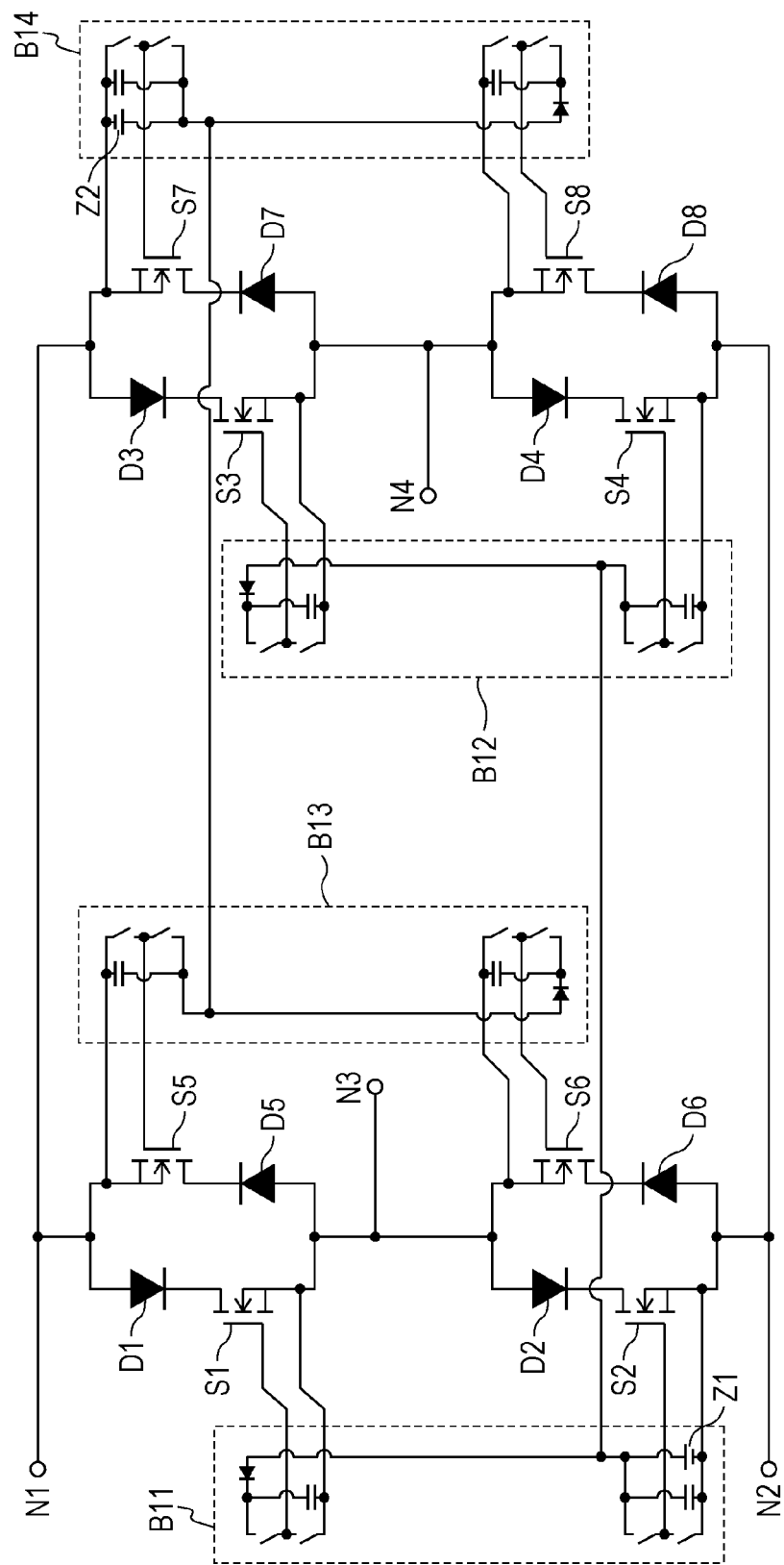
FIG. 17 is a circuit diagram illustrating a configuration of an inverter circuit according to a second comparative example.

FIG. 17 is a circuit diagram illustrating a configuration of an inverter circuit according to a second comparative example that converts and transmits direct-current electric power or alternating-current electric power bi-directionally between port terminals N1 and N2 and port terminals N3 and N4. The inverter circuit illustrated in FIG. 17 includes eight diodes D1 through D8, eight switches S1 through S8, and four bootstrap circuits B11 through B14. The switches S1 through S8 are N-channel MOSFETs. The eight switches S1 through S8 are driven by the bootstrap circuits B11 through B14. The switches S1 and S5 and the diodes D1 and D5 are connected so that electric power is transferred bi-directionally between the port terminals N1 and N3. The switches S2 and S6 and the diodes D2 and D6 are connected so that electric power is transferred bi-directionally between the port terminals N2 and N3. The switches S3 and S7 and the diodes D3 and D7 are connected so that electric power is transferred bi-directionally between the port terminals N1 and N4. The switches S4 and S8 and the diodes D4 and D8 are connected so that electric power is transferred bi-directionally between the port terminals N2 and N4. In this way, the inverter circuit illustrated in FIG. 17 converts and transmits electric power bi-directionally.

The bootstrap circuits B11 and B12 illustrated in FIG. 17 are configured in a manner similar to the bootstrap circuits B11 and B12 illustrated in FIG. 15. The bootstrap circuits B13 and B14 illustrated in FIG. 17 are configured in a manner similar to the bootstrap circuits B11 and B12 illustrated in FIG. 15 and include an isolated power source Z2 instead of the isolated power source Z1.

In the inverter circuit illustrated in FIG. 17, the eight switches S1 through S8 are driven by the two isolated power sources Z1 and Z2. Accordingly, the first switch S1 and the second switch S2 are driven by the first bootstrap circuit B11 having two pairs of output terminals. The third switch S3 and the fourth switch S4 are driven by the second bootstrap circuit B12 having two pairs of output terminals. The fifth switch S5 and the sixth switch S6 are driven by the third bootstrap circuit B13 having two pairs of output terminals. The seventh switch S7 and the eighth switch S8 are driven by the fourth bootstrap circuit B14 having two pairs of output terminals.

Figure 18:
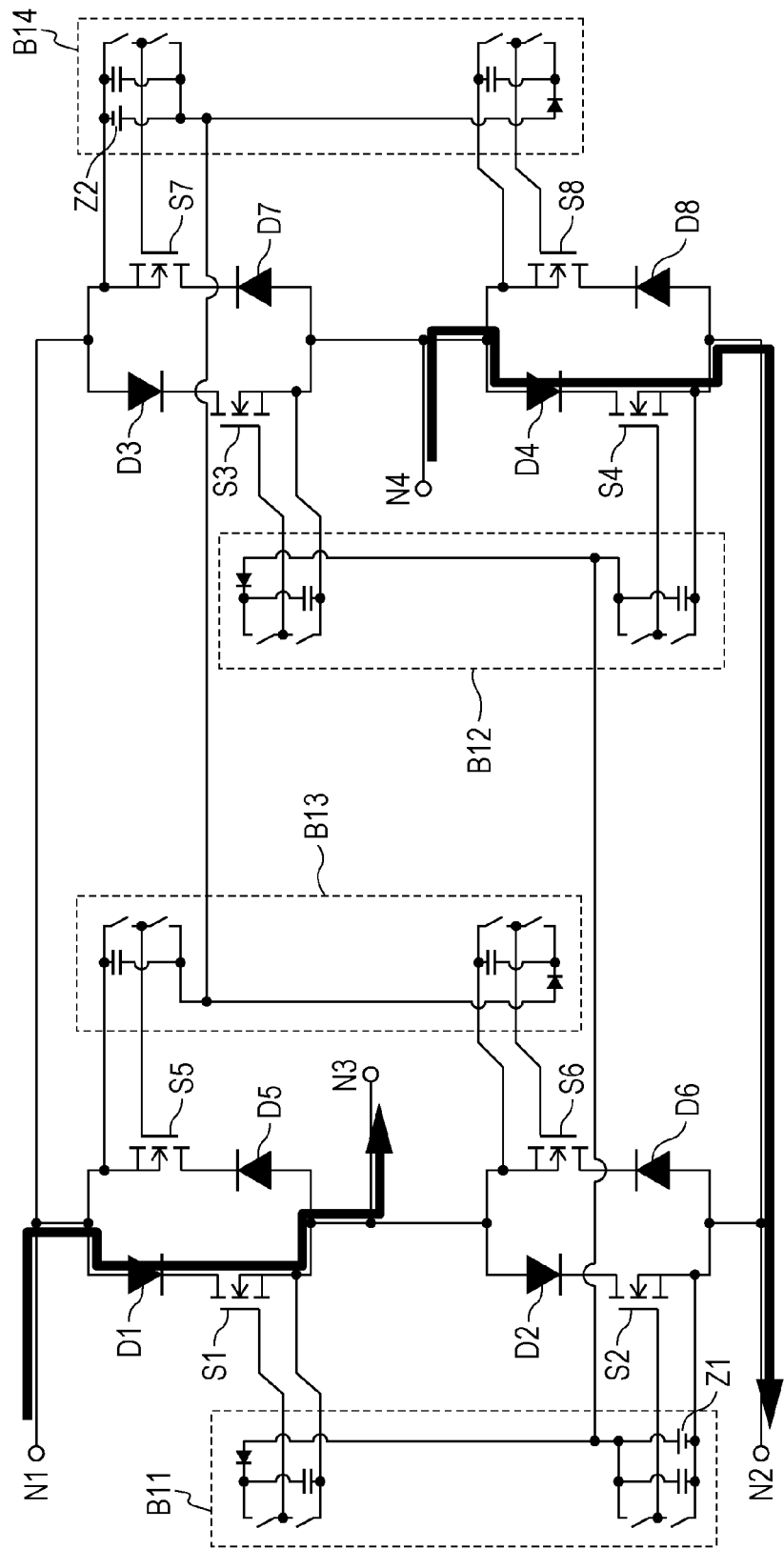
FIG. 18 illustrates ideal operation of the inverter circuit according to the second comparative example.
Figure 19:
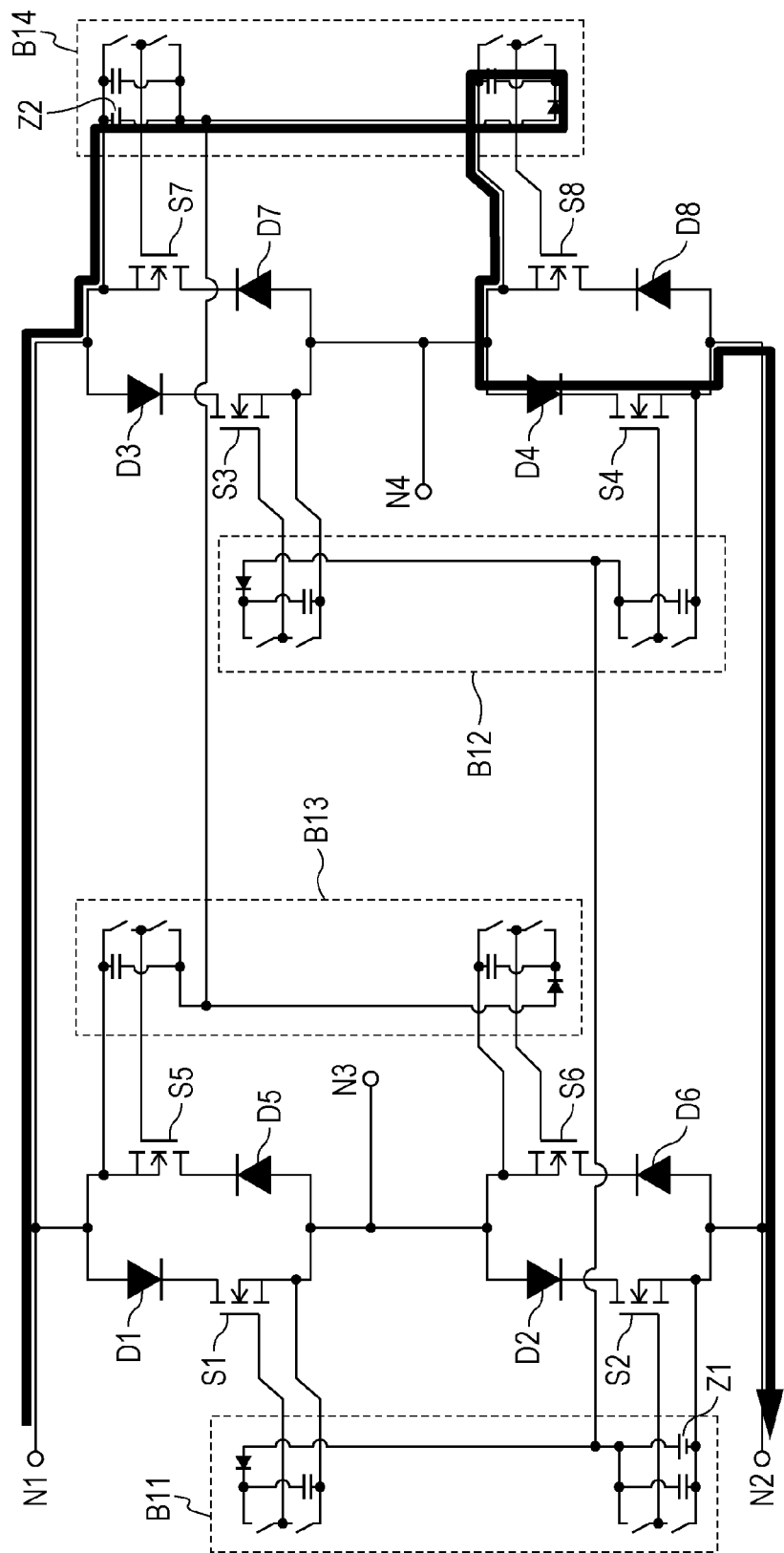
FIG. 19 illustrates actual operation of the inverter circuit according to the second comparative example.

FIG. 18 illustrates ideal operation of the inverter circuit illustrated in FIG. 17. FIG. 19 illustrates actual operation of the inverter circuit illustrated in FIG. 17. Assume that alternating-current electric power is input from the port terminals N1 and N2 of the inverter circuit illustrated in FIG. 17 and that a positive voltage based on an electric potential of the port terminal N2 is applied to the port terminal N1. When the first switch S1 and the fourth switch S4 are on, it is originally intended to pass an electric current through a path indicated by the arrow in FIG. 18. However, the electric current also flows through a path indicated by the arrow in FIG. 19, and an input voltage is applied to a high-side capacitor of the bootstrap circuit B14. As a result, switches used in the bootstrap circuit B14, which generally have low voltage resistance, break down.

Figure 20:
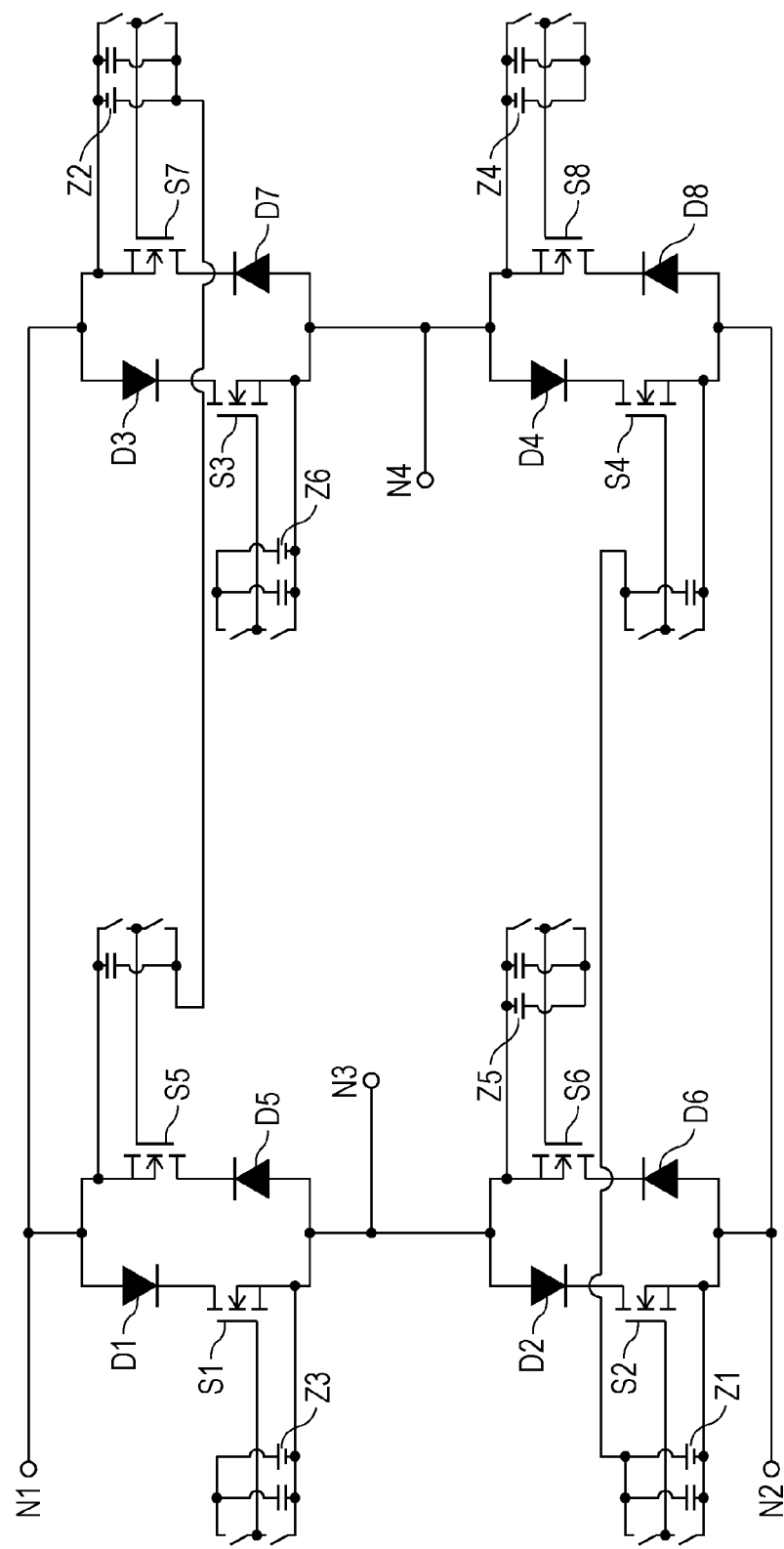
FIG. 20 is a circuit diagram illustrating a configuration of an inverter circuit according to a third comparative example.

FIG. 20 is a circuit diagram illustrating a configuration of an inverter circuit according to a third comparative example that converts and transmits direct-current electric power or alternating-current electric power bi-directionally between port terminals N1 and N2 and port terminals N3 and N4. In order to avoid the problem of FIG. 19, the inverter circuit illustrated in FIG. 20 includes six isolated power sources Z1 through Z6. Use of the six isolated power sources Z1 through Z6 as illustrated in FIG. 20 makes it possible to drive eight switches S1 through S8 as originally intended. However, the number of isolated power sources is large, and the size and cost of the electric power conversion circuit increase accordingly.

In view of this, there are needs for an electric power conversion circuit that is lower in cost and smaller in size than the circuits of the comparative examples.

The inventors accomplished a circuit configuration of the present disclosure in view of the above findings.

Embodiments of the present disclosure are described below with reference to the drawings. In the embodiments below, similar constituent elements are given identical reference signs.

In the present disclosure, ordinal numbers such as "first" and "second" are used not to describe a temporal or spatial order but to distinguish similar constituent elements. These ordinal numbers are interchangeable as appropriate.

First Embodiment

Figure 1:
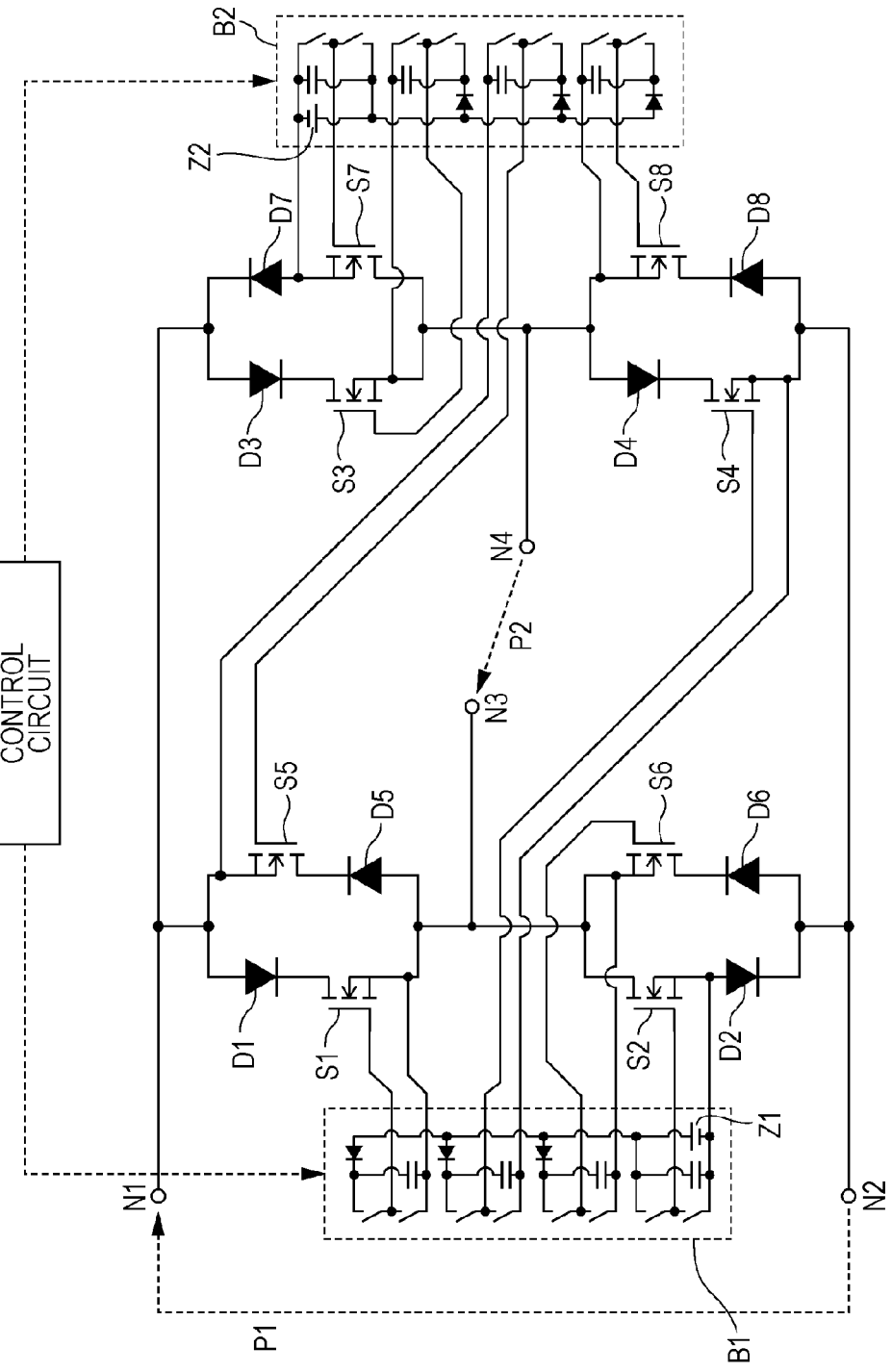
FIG. 1 is a circuit diagram illustrating an example of a configuration of an electric power conversion circuit according to a first embodiment.

FIG. 1 is a circuit diagram illustrating a configuration of an electric power conversion circuit according to a first embodiment. The electric power conversion circuit illustrated in FIG. 1 includes port terminals N1 through N4, diodes D1 through D8, switches S1 through S8, bootstrap circuits B1 and B2, and a control circuit 10.

The port terminals N1 through N4 are examples of "first through fourth port terminals" of the present disclosure, respectively. The diodes D1 through D8 are examples of "first through eighth diodes" of the present disclosure, respectively. The switches S1 through S8 are examples of "first through eighth switches" of the present disclosure, respectively. The bootstrap circuits B1 and B2 are examples of "first and second bootstrap circuits" of the present disclosure, respectively.

The electric power conversion circuit illustrated in FIG. 1 converts and transmits direct-current electric power or alternating-current electric power bi-directionally between the port terminals N1 and N2 and the port terminals N3 and N4. The port terminals N1 and N2 constitute a first port P1 for input and output of electric power, and the port terminals N3 and N4 constitute a second port P2 for input and output of electric power.

The switches S1 through S8 are N-channel MOSFETs. Each of the switches S1 through S8 has a drain (first terminal), a source (second terminal), and a gate (control terminal).

The diode D1 and the switch S1 are connected in series between the port terminal N1 and the port terminal N3 so that an electric current flows from the port terminal N1 to the port terminal N3 when the switch S1 is on. The positions of the diode D1 and the switch S1 are interchangeable. For example, the switch S1 is connected to the port terminal N1 via the diode D1. In this case, an anode of the diode D1 is connected to the port terminal N1, a cathode of the diode D1 is connected to a drain of the switch S1, and a source of the switch S1 is connected to the port terminal N3.

The diode D2 and the switch S2 are connected in series between the port terminal N3 and the port terminal N2 so that an electric current flows from the port terminal N3 to the port terminal N2 when the switch S2 is on. The switch S2 is connected to the port terminal N2 via the diode D2. A cathode of the diode D2 is connected to the port terminal N2, an anode of the diode D2 is connected to a source of the switch S2, and a drain of the switch S2 is connected to the port terminal N3.

The diode D3 and the switch S3 are connected in series between the port terminal N1 and the port terminal N4 so that an electric current flows from the port terminal N1 to the port terminal N4 when the switch S3 is on. The positions of the diode D3 and the switch S3 are interchangeable. For example, the switch S3 is connected to the port terminal N1 via the diode D3. In this case, an anode of the diode D3 is connected to the port terminal N1, a cathode of the diode D3 is connected to a drain of the switch S3, and a source of the switch S3 is connected to the port terminal N4.

The diode D4 and the switch S4 are connected in series between the port terminal N4 and the port terminal N2 so that an electric current flows from the port terminal N4 to the port terminal N2 when the switch S4 is on. The positions of the diode D4 and the switch S4 are interchangeable. For example, the switch S4 is connected to the port terminal N4 via the diode D4. In this case, a source of the switch S4 is connected to the port terminal N2, a drain of the switch S4 is connected to a cathode of the diode D4, and an anode of the diode D4 is connected to the port terminal N4.

The diode D5 and the switch S5 are connected in series between the port terminal N3 and the port terminal N1 so that an electric current flows from the port terminal N3 to the port terminal N1 when the switch S5 is on. The positions of the diode D5 and the switch S5 are interchangeable. For example, the switch S5 is connected to the port terminal N3 via the diode D5. In this case, a source of the switch S5 is connected to the port terminal N1, a drain of the switch S5 is connected to a cathode of the diode D5, and an anode of the diode D5 is connected to the port terminal N3.

The diode D6 and the switch S6 are connected in series between the port terminal N2 and the port terminal N3 so that an electric current flows from the port terminal N2 to the port terminal N3 when the switch S6 is on. The positions of the diode D6 and the switch S6 are interchangeable. For example, the switch S6 is connected to the port terminal N2 via the diode D6. In this case, an anode of the diode D6 is connected to the port terminal N2, a cathode of the diode D6 is connected to a drain of the switch S6, and a source of the switch S6 is connected to the port terminal N3.

The diode D7 and the switch S7 are connected in series between the port terminal N4 and the port terminal N1 so that an electric current flows from the port terminal N4 to the port terminal N1 when the switch S7 is on. The switch S7 is connected to the port terminal N1 via the diode D7. In this case, a cathode of the diode D7 is connected to the port terminal N1, an anode of the diode D7 is connected to a source of the switch S7, and a drain of the switch S7 is connected to the port terminal N4.

The diode D8 and the switch S8 are connected in series between the port terminal N2 and the port terminal N4 so that an electric current flows from the port terminal N2 to the port terminal N4 when the switch S8 is on. The positions of the diode D8 and the switch S8 are interchangeable. For example, the switch S8 is connected to the port terminal N2 via the diode D8. In this case, an anode of the diode D8 is connected to the port terminal N2, a cathode of the diode D8 is connected to a drain of the switch S8, and a source of the switch S8 is connected to the port terminal N4.

Each of the switches S1 through S8 is connected so that an electric current flows from a drain to a source thereof when the switch is on.

The control circuit 10 generates control signals for turning on or off the switches S1 through S8 and send the control signals to the bootstrap circuits B1 and B2.

Each of the bootstrap circuits B1 and B2 has four pairs of output terminals. The bootstrap circuit B1 includes an isolated power source Z1 and applies predetermined voltages based on electric potentials of the sources of the switches S1, S2, S4, and S6 to gates of the respective switches in accordance with the control signals. The bootstrap circuit B2 includes an isolated power source Z2 and applies predetermined voltages based on electric potentials of the sources of the switches S3, S5, S7, and S8 to gates of the respective switches in accordance with the control signals. The isolated power sources Z1 and Z2 are electrically isolated from sources of power supply to the isolated power sources Z1 and Z2 themselves.

Figure 2A:
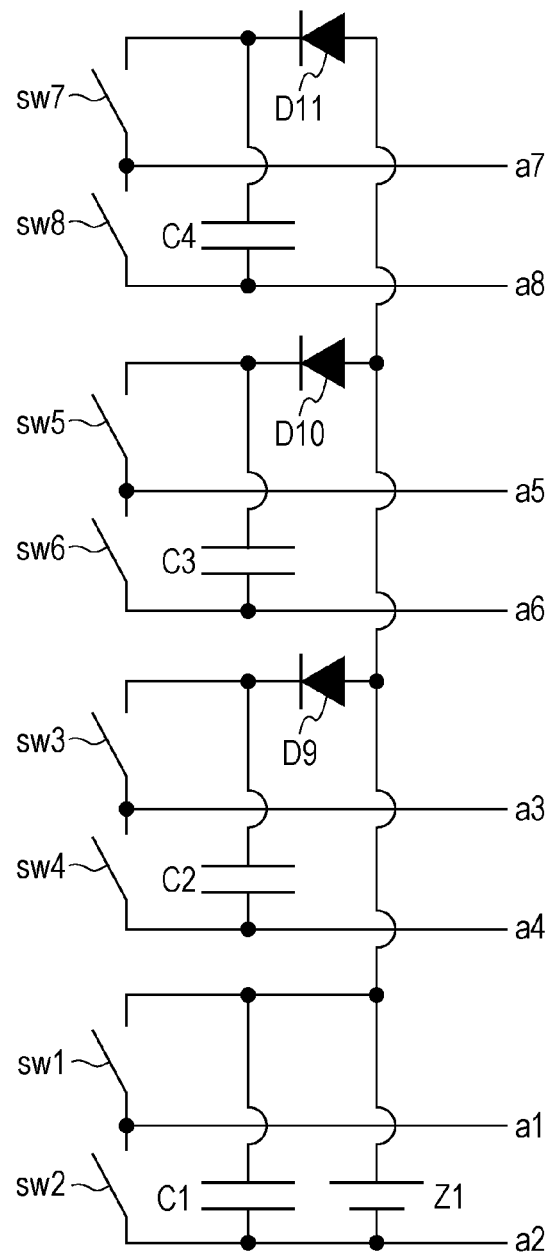
FIG. 2A is a circuit diagram illustrating an example of a configuration of a first bootstrap circuit according to the first embodiment.

FIG. 2A is a circuit diagram illustrating a configuration of the bootstrap circuit B1 illustrated in FIG. 1. The bootstrap circuit B1 includes the isolated power source Z1, capacitors C1 through C4, switches sw1 through sw8, and diodes D9 through D11.

The isolated power source Z1 is an example of "first voltage source" of the present disclosure. The capacitors C2 through C4 are examples of "first through third capacitors" of the present disclosure, respectively. The diodes D9 through D11 are examples of "ninth through eleventh diodes" of the present disclosure, respectively.

The switches sw1 through sw8 are turned on or off in accordance with control signals supplied from the control circuit 10. A negative electrode of the isolated power source Z1 is connected to one end of the capacitor C1 and is connected to the source of the switch S2. A voltage of the isolated power source Z1 is applied to the capacitor C1 as it is, and the voltage of the isolated power source Z1 is applied to the capacitors C2 through C4 via the diodes D9 through D11, respectively. The bootstrap circuit B1 applies the voltage of the isolated power source Z1 or the capacitors C1 through C4 based on electric potentials of the sources of the switches S1, S2, S4, and S6 to gates of the respective switches in accordance with the control signals.

Terminals a1 and a2, terminals a3 and a4, terminals a5 and a6, and terminals a7 and a8 constitute four pairs of output terminals of the bootstrap circuit B1

The terminal a1 is connected to the gate of the switch S2, and the terminal a2 is connected to the source of the switch S2. When the switch sw1 is turned on, a voltage of the capacitor C1 is applied to the gate of the switch S2. When the switch sw2 is turned on, the gate of the switch S2 is reset.

The terminal a3 is connected to the gate of the switch S6, and the terminal a4 is connected to the source of the switch S6. When the switch sw3 is turned on, a voltage of the capacitor C2 is applied to the gate of the switch S6. When the switch sw4 is turned on, the gate of the switch S6 is reset.

The terminal a5 is connected to the gate of the switch S4, and the terminal a6 is connected to the source of the switch S4. When the switch sw5 is turned on, a voltage of the capacitor C3 is applied to the gate of the switch S4. When the switch sw6 is turned on, the gate of the switch S4 is reset.

The terminal a7 is connected to the gate of the switch S1, and the terminal a8 is connected to the source of the switch S1. When the switch sw7 is turned on, a voltage of the capacitor C4 is applied to the gate of the switch S1. When the switch sw8 is turned on, the gate of the switch S1 is reset.

Figure 2B:
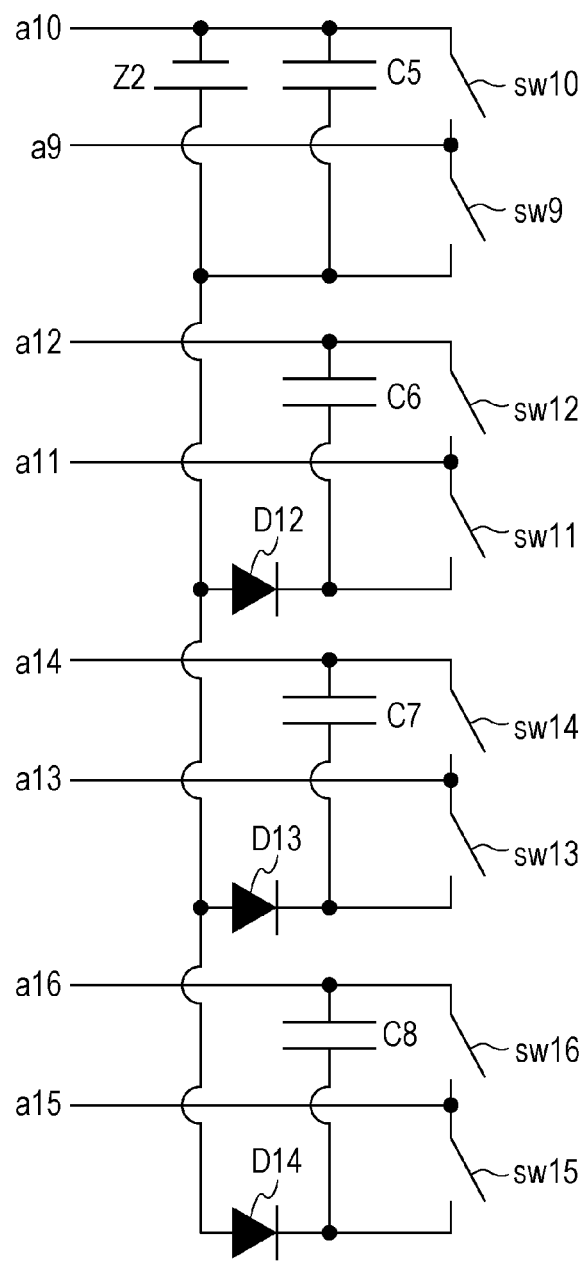
FIG. 2B is a circuit diagram illustrating an example of a configuration of a second bootstrap circuit according to the first embodiment.

FIG. 2B is a circuit diagram illustrating a configuration of the bootstrap circuit B2 illustrated in FIG. 1. The bootstrap circuit B2 includes the isolated power source Z2, capacitors C5 through C8, switches sw9 through sw16, and diodes D12 through D14.

The isolated power source Z2 is an example of "second voltage source" of the present disclosure. The capacitors C6 through C8 are examples of "fourth through sixth capacitors" of the present disclosure, respectively. The diodes D12 through D14 are examples of "twelfth through fourteenth diodes" of the present disclosure, respectively.

The switches sw9 through sw16 are turned on or off in accordance with control signals supplied from the control circuit 10. A negative electrode of the isolated power source Z2 is connected to one end of the capacitor C5 and is connected to the source of the switch S7. A voltage of the isolated power source Z2 is applied to the capacitor C5 as it is, and the voltage of the isolated power source Z2 is applied to the capacitors C6 through C8 via the diodes D12 through D14, respectively. The bootstrap circuit B2 applies the voltage of the isolated power source Z2 or the capacitors C5 through C8 based on electric potentials of the sources of the switches S3, S5, S7, and S8 to gates of the respective switches in accordance with the control signals.

Terminals a9 and a10, terminals a11 and a12, terminals a13 and a14, and terminals a15 and a16 constitute four pairs of output terminals of the bootstrap circuit B2.

The terminal a9 is connected to the gate of the switch S7, and the terminal a10 is connected to the source of the switch S7. When the switch sw9 is turned on, a voltage of the capacitor C5 is applied to the gate of the switch S7. When the switch sw10 is turned on, the gate of the switch S7 is reset.

The terminal a11 is connected to the gate of the switch S3, and the terminal a12 is connected to the source of the switch S3. When the switch sw11 is turned on, a voltage of the capacitor C6 is applied to the gate of the switch S3. When the switch sw12 is turned on, the gate of the switch S3 is reset.

The terminal a13 is connected to the gate of the switch S5, and the terminal a14 is connected to the source of the switch S5. When the switch sw13 is turned on, a voltage of the capacitor C7 is applied to the gate of the switch S5. When the switch sw14 is turned on, the gate of the switch S5 is reset.

The terminal a15 is connected to the gate of the switch S8, and the terminal a16 is connected to the source of the switch S8. When the switch sw15 is turned on, a voltage of the capacitor C8 is applied to the gate of the switch S8. When the switch sw16 is turned on, the gate of the switch S8 is reset.

Even in a case where the capacitor C1 is omitted, the bootstrap circuit B1 can operate in a manner similar to a case where the bootstrap circuit B1 includes the capacitor C1. Even in a case where the capacitor C5 is omitted, the bootstrap circuit B2 can operate in a manner similar to a case where the bootstrap circuit B2 includes the capacitor C5.

Next, operation performed when electric power is input to the electric power conversion circuit illustrated in FIG. 1 from the port P1 is described with reference to FIGS. 3 through 6.

Figure 3:
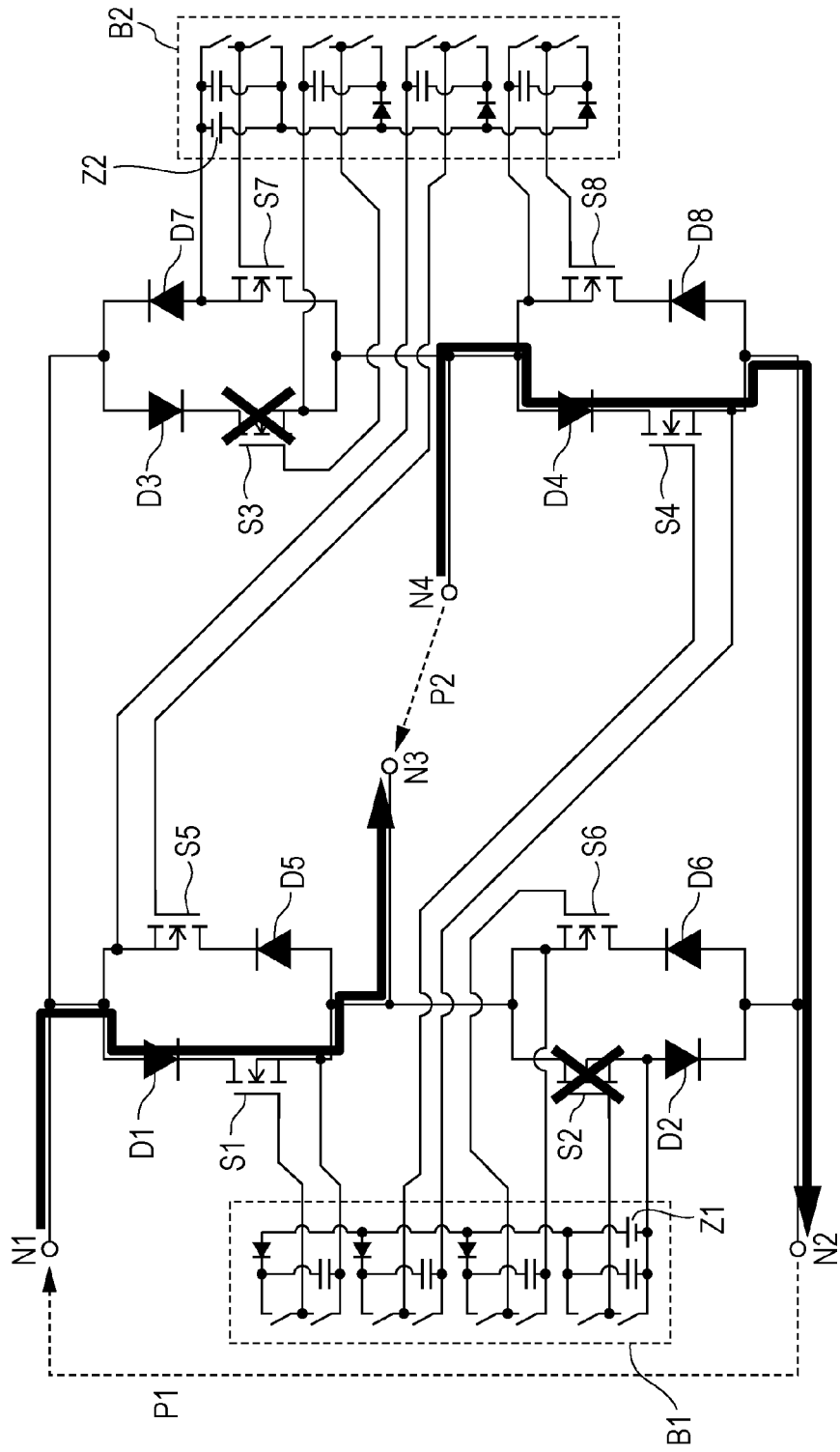
FIG. 3 illustrates an electric current path in a first operation mode in the electric power conversion circuit according to the first embodiment.
Figure 4:
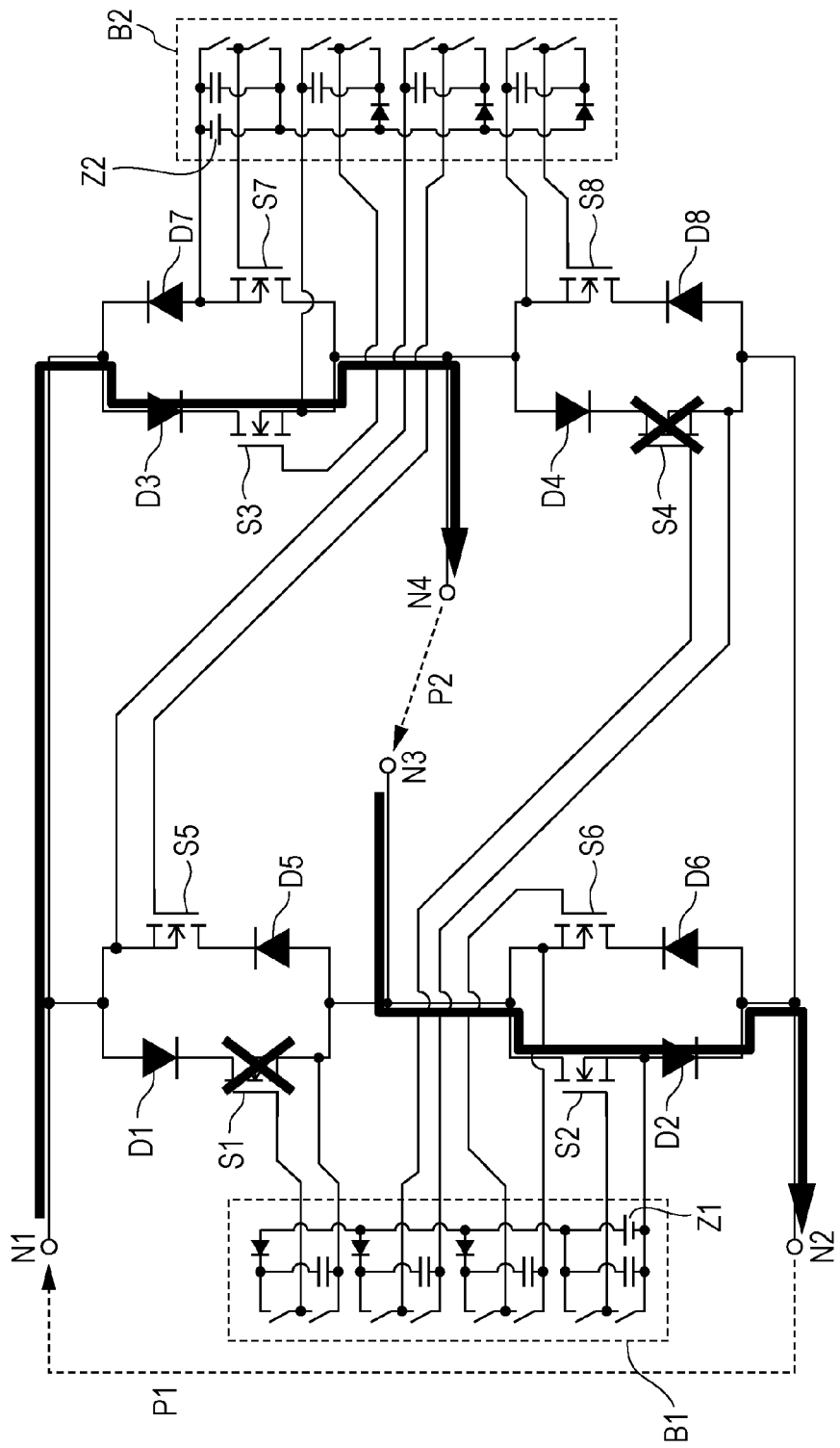
FIG. 4 illustrates an electric current path in a second operation mode in the electric power conversion circuit according to the first embodiment.
Figure 5:
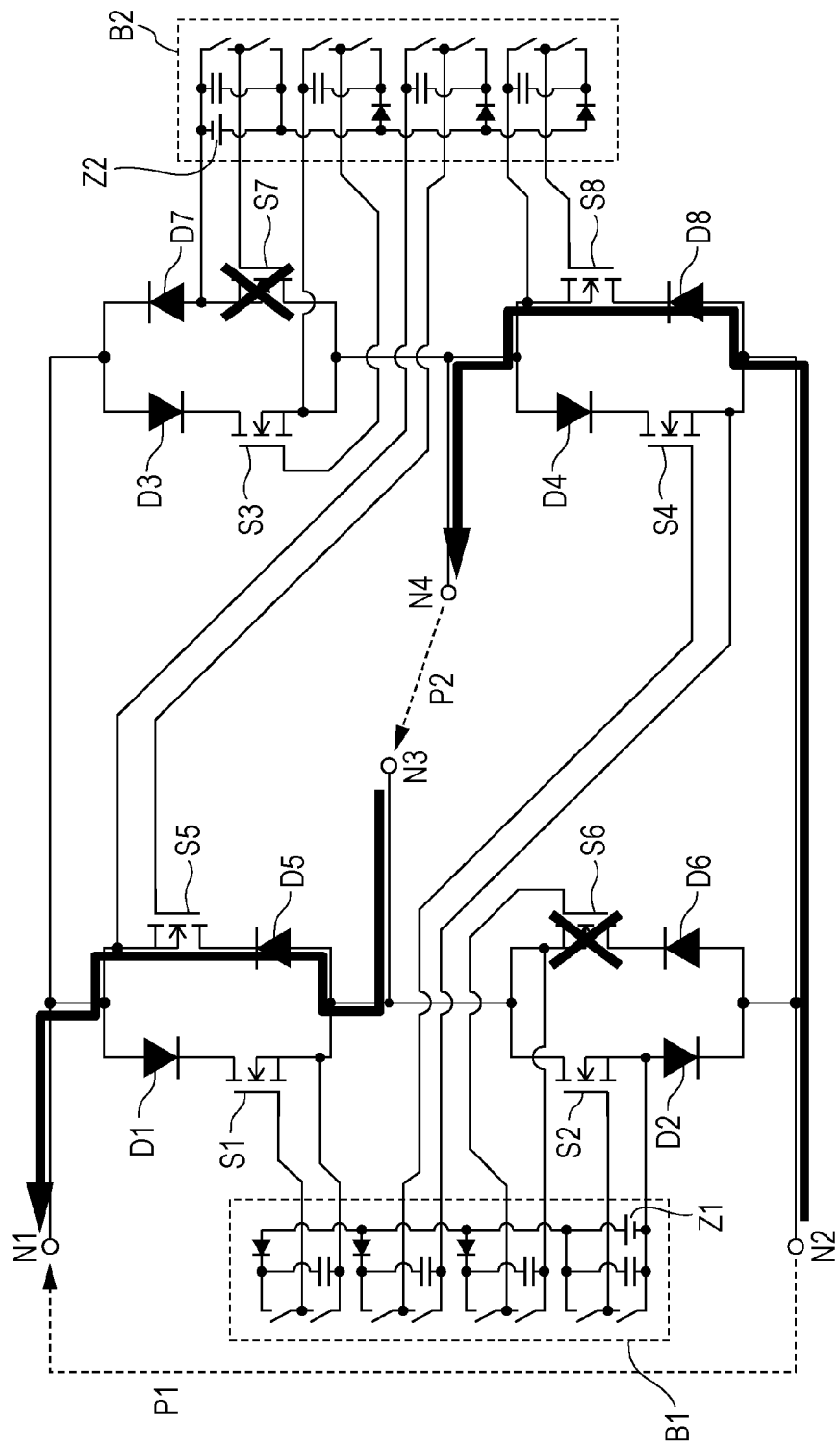
FIG. 5 illustrates an electric current path in a third operation mode in the electric power conversion circuit according to the first embodiment.
Figure 6:
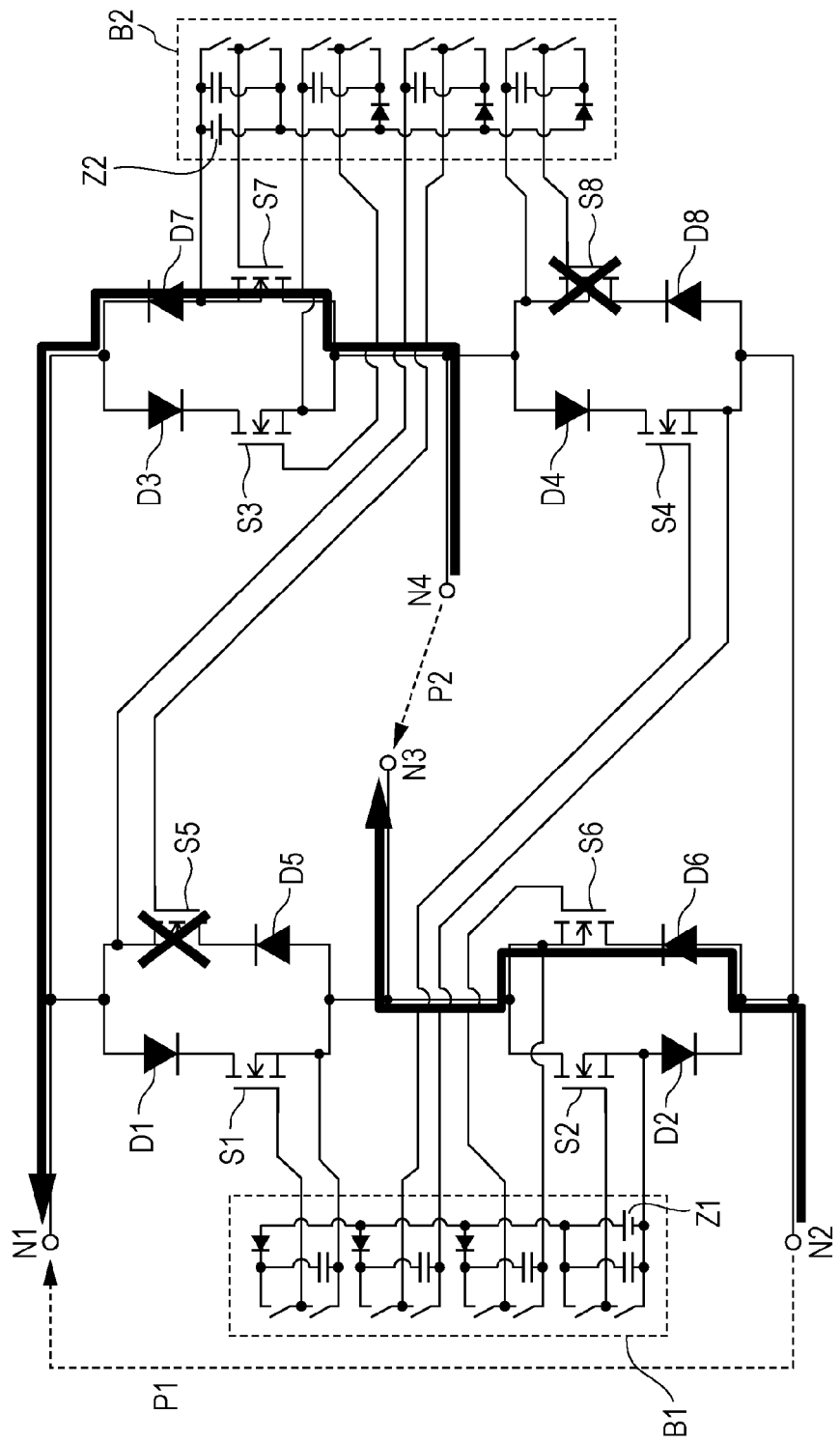
FIG. 6 illustrates an electric current path in a fourth operation mode in the electric power conversion circuit according to the first embodiment.

FIG. 3 illustrates a first operation mode when electric power is input to the electric power conversion circuit illustrated in FIG. 1 from the port P1. FIG. 4 illustrates a second operation mode when electric power is input to the electric power conversion circuit illustrated in FIG. 1 from the port P1. FIG. 5 illustrates a third operation mode when electric power is input to the electric power conversion circuit illustrated in FIG. 1 from the port P1. FIG. 6 illustrates a fourth operation mode when electric power is input to the electric power conversion circuit illustrated in FIG. 1 from the port P1.

The control signals are predetermined code sequences. The electric power conversion circuit performs code modulation or code demodulation of electric power input from the port terminals N1 and N2 in accordance with the code sequences and then outputs the electric power thus subjected to code modulation or code demodulation from the port terminals N3 and N4.

In the first operation mode illustrated in FIG. 3, the first switch S1 and the fourth switch S4 are on, and the second switch S2 and the third switch S3 are off. In the second operation mode illustrated in FIG. 4, the first switch S1 and the fourth switch S4 are off, and the second switch S2 and the third switch S3 are on. In the third operation mode illustrated in FIG. 5, the fifth switch S5 and the eighth switch S8 are on, and the sixth switch S6 and the seventh switch S7 are off. In the fourth operation mode illustrated in FIG. 6, the fifth switch S5 and the eighth switch S8 are off, and the sixth switch S6 and the seventh switch S7 are on. When a positive electric current is input from the port terminal N1, the first operation mode and the second operation mode are alternated. When a negative electric current is input from the port terminal N1, the third operation mode and the fourth operation mode are alternated. As a result, the electric power conversion circuit illustrated in FIG. 1 outputs electric power that has been subjected to code modulation or code demodulation from the port terminals N3 and N4.

Next, operation performed when electric power is input to the electric power conversion circuit illustrated in FIG. 1 from the port P2 is described with reference to FIGS. 7 through 10.

The electric power conversion circuit illustrated in FIG. 1 can not only convert electric power input from the first port P1 and then output the electric power from the second port P2, but also convert electric power input from the second port P2 and then output the electric power from the first port P1.

Figure 7:
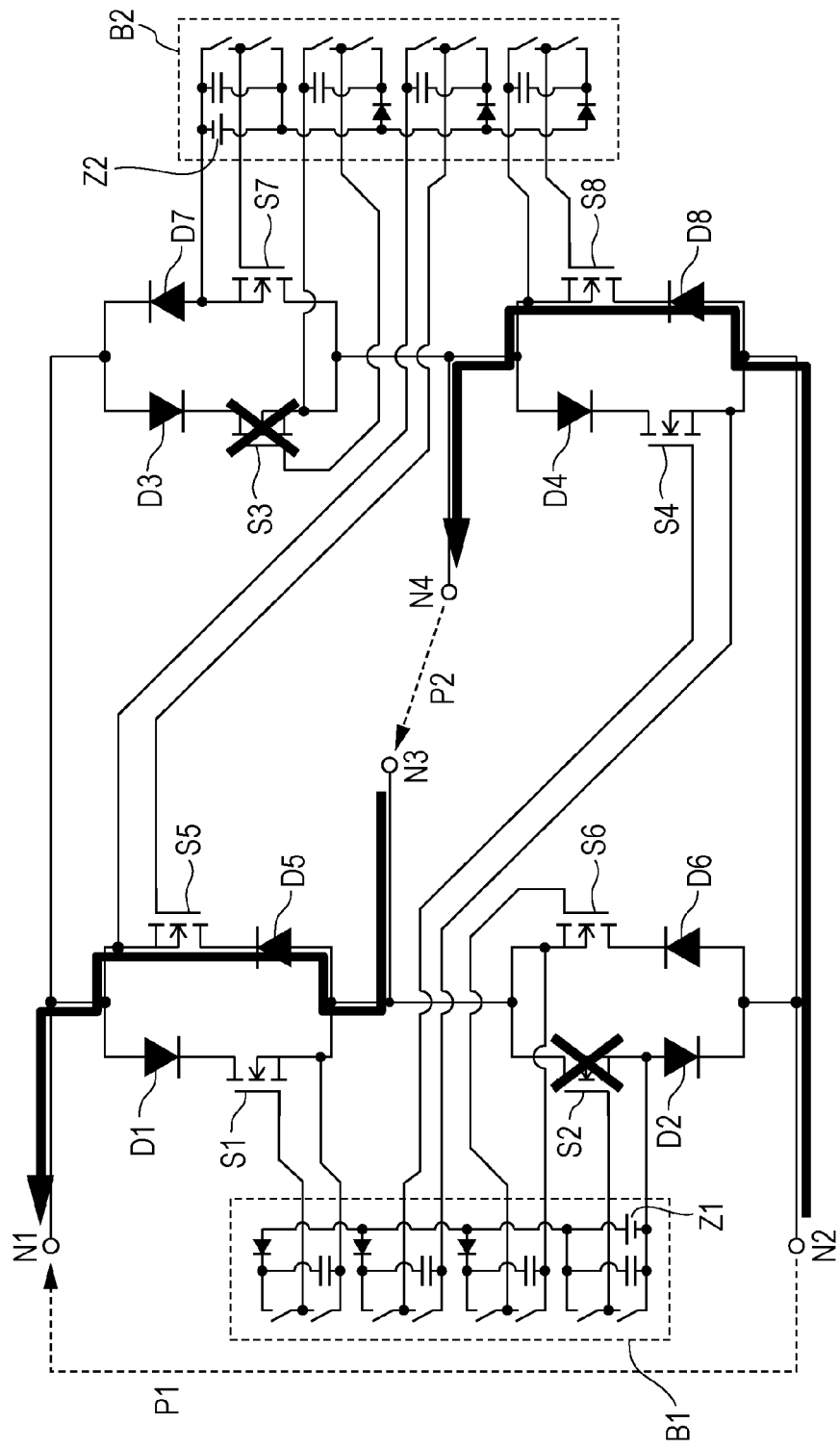
FIG. 7 illustrates an electric current path in a fifth operation mode in the electric power conversion circuit according to the first embodiment.
Figure 8:
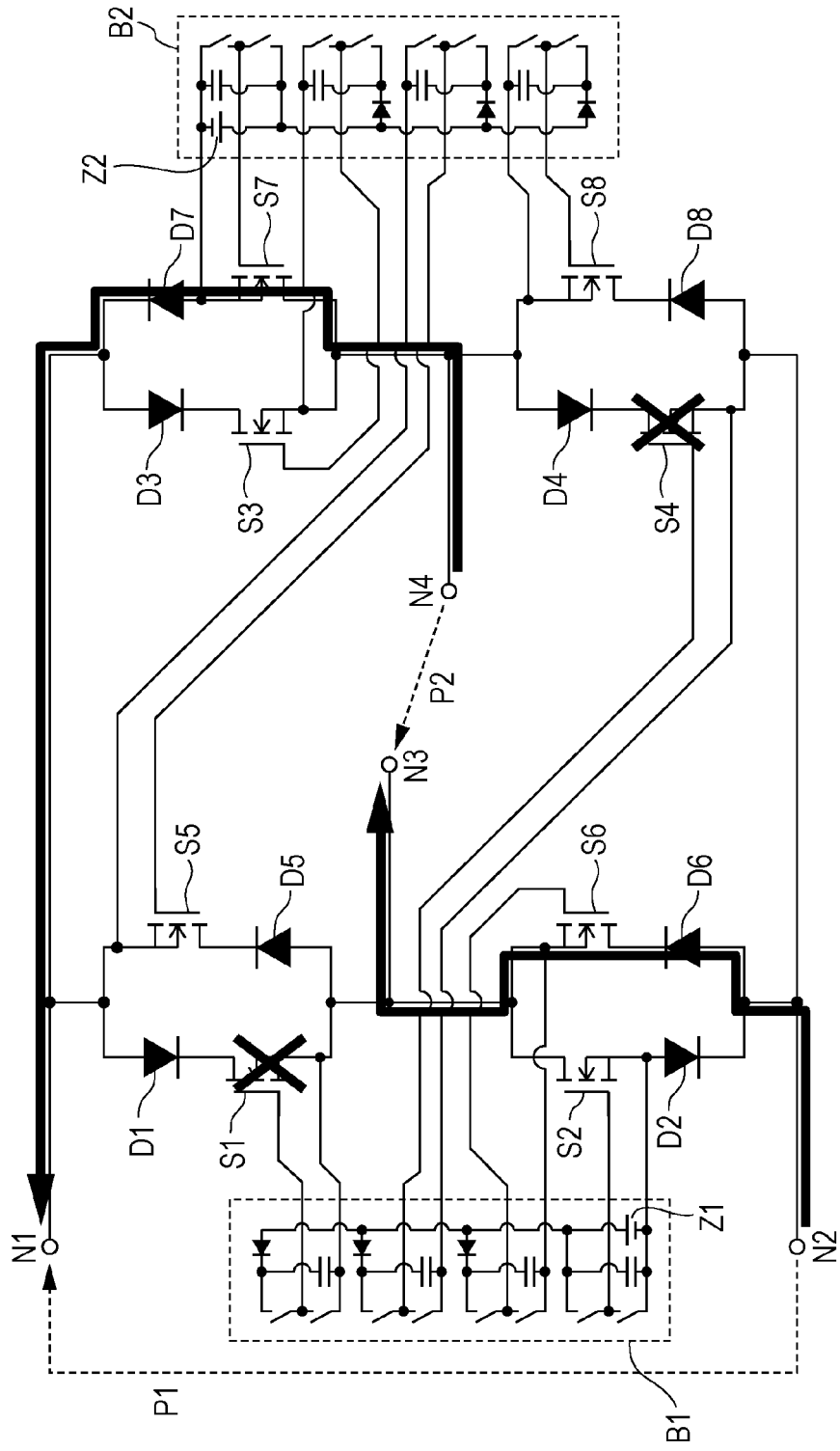
FIG. 8 illustrates an electric current path in a sixth operation mode in the electric power conversion circuit according to the first embodiment.
Figure 9:
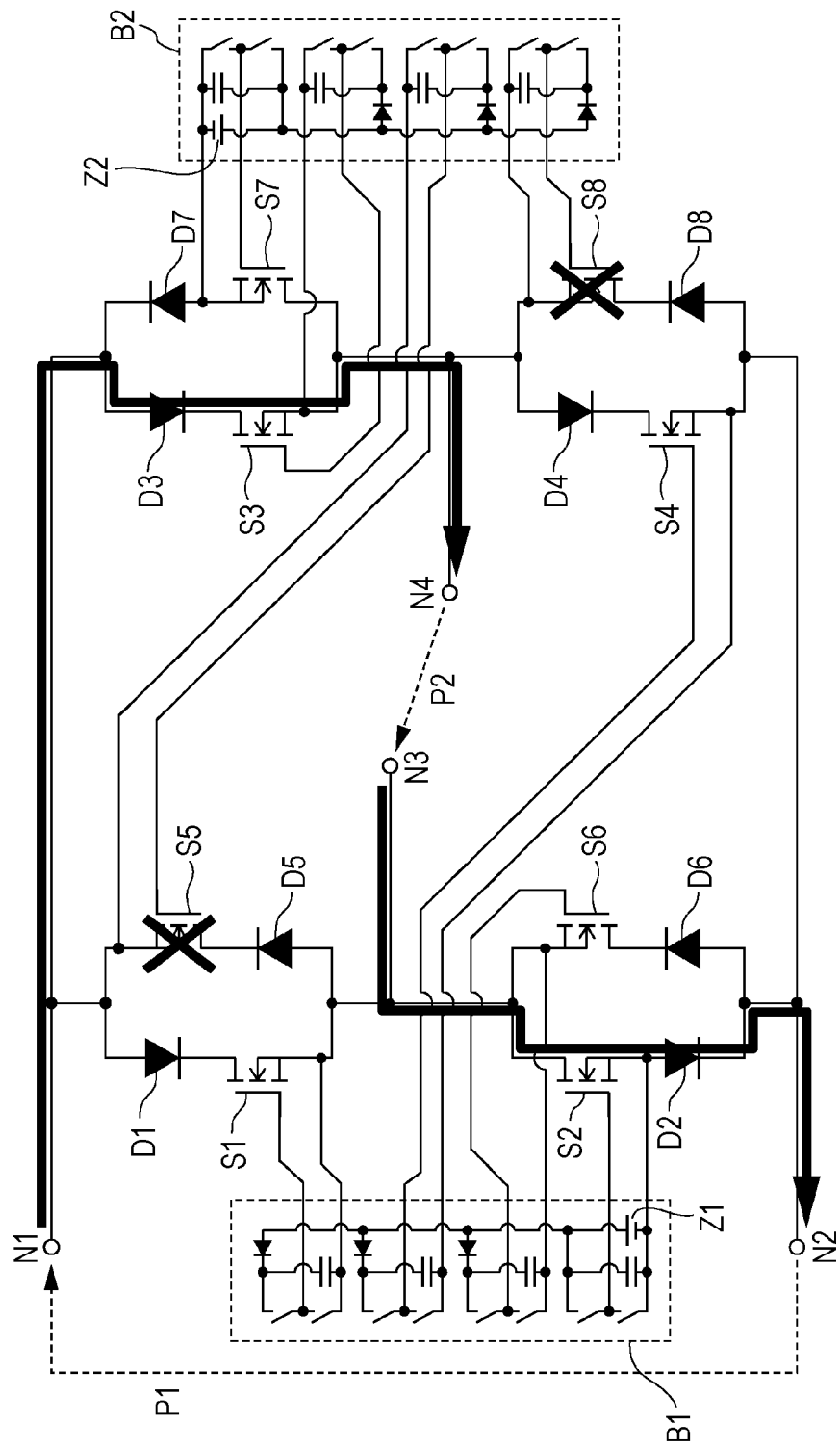
FIG. 9 illustrates an electric current path in a seventh operation mode in the electric power conversion circuit according to the first embodiment.
Figure 10:
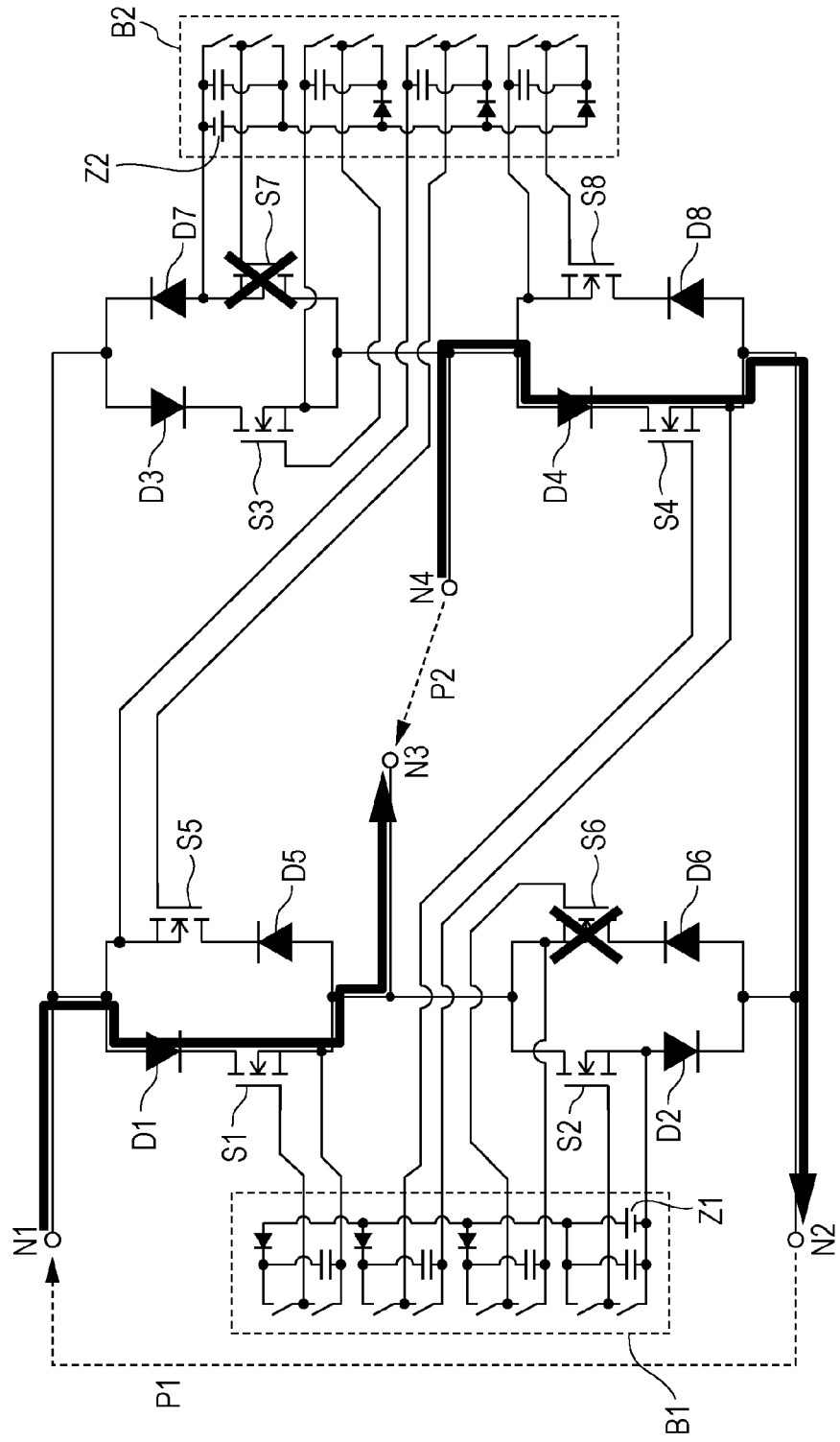
FIG. 10 illustrates an electric current path in an eighth operation mode in the electric power conversion circuit according to the first embodiment.

FIG. 7 illustrates a fifth operation mode when electric power is input to the electric power conversion circuit illustrated in FIG. 1 from the port P2. FIG. 8 illustrates a sixth operation mode when electric power is input to the electric power conversion circuit illustrated in FIG. 1 from the port P2. FIG. 9 illustrates a seventh operation mode when electric power is input to the electric power conversion circuit illustrated in FIG. 1 from the port P2. FIG. 10 illustrates an eighth operation mode when electric power is input to the electric power conversion circuit illustrated in FIG. 1 from the port P2.

The control signals are predetermined code sequences. The electric power conversion circuit performs code modulation or code demodulation of electric power input from the port terminals N3 and N4 in accordance with the code sequences and then outputs the electric power thus subjected to code modulation or code demodulation from the port terminals N1 and N2.

In the fifth operation mode illustrated in FIG. 7, the fifth switch S5 and the eighth switch S8 are on, and the second switch S2 and the third switch S3 are off. In the sixth operation mode illustrated in FIG. 8, the sixth switch S6 and the seventh switch S7 are on, and the first switch S1 and the fourth switch S4 are off. In the seventh operation mode illustrated in FIG. 9, the second switch S2 and the third switch S3 are on, and the fifth switch S5 and the eighth switch S8 are off. In the eighth operation mode illustrated in FIG. 10, the first switch S1 and the fourth switch S4 are on, and the sixth switch S6 and the seventh switch S7 are off. When a positive electric current is output from the port terminal N1, the fifth operation mode and the sixth operation mode are alternated. When a negative electric current is output from the port terminal N1, the seventh operation mode and the eighth operation mode are alternated. As a result, the electric power conversion circuit illustrated in FIG. 1 outputs the electric power that has been subjected to code modulation or code demodulation from the port terminals N1 and N2.

In order to drive the plurality of switches S1, S2, S4, and S6 by the bootstrap circuit B1, an operation mode in which a source of a switch that is directly connected to the negative electrode of the isolated power source Z1 and sources of other switches have equal electric potentials is needed. Furthermore, in order to drive the plurality of switches S3, S5, S7, and S8 by the bootstrap circuit B2, an operation mode in which a source of a switch that is directly connected to the negative terminal of the isolated power source Z2 and sources of other switches have equal electric potentials is needed.

Figure 11:
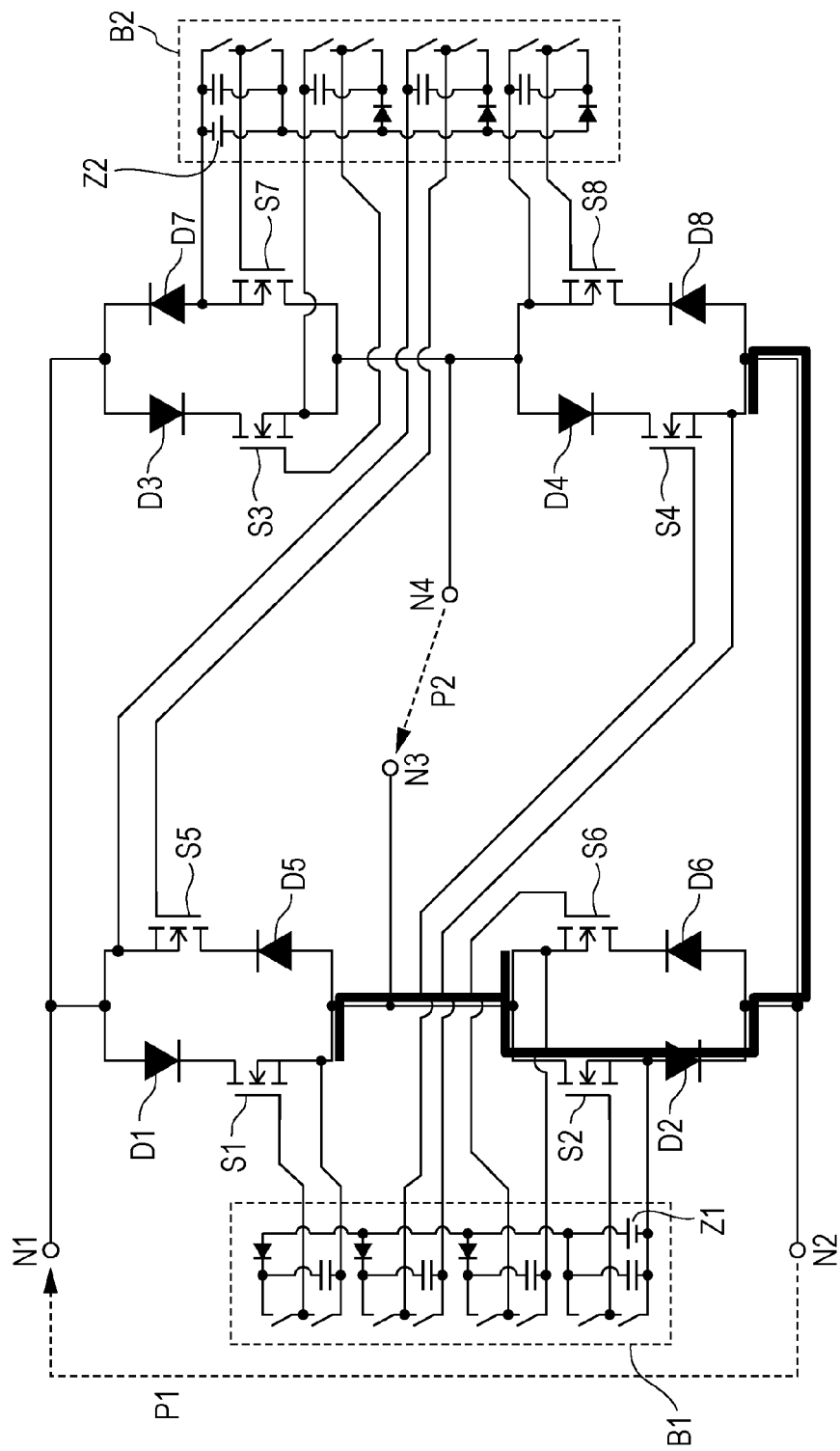
FIG. 11 illustrates a first conduction state in the electric power conversion circuit according to the first embodiment.

FIG. 11 illustrates a first conduction state of the electric power conversion circuit of FIG. 1. As illustrated in FIG. 11, when the second switch S2 is on, the sources of the first switch S1, the fourth switch S4, and the sixth switch S6 have electric potentials equal to the source of the second switch S2. Accordingly, the first switch S1, the second switch S2, the fourth switch S4, and the sixth switch S6 can be driven by the single bootstrap circuit B1 having four pairs of output terminals.

Figure 12:
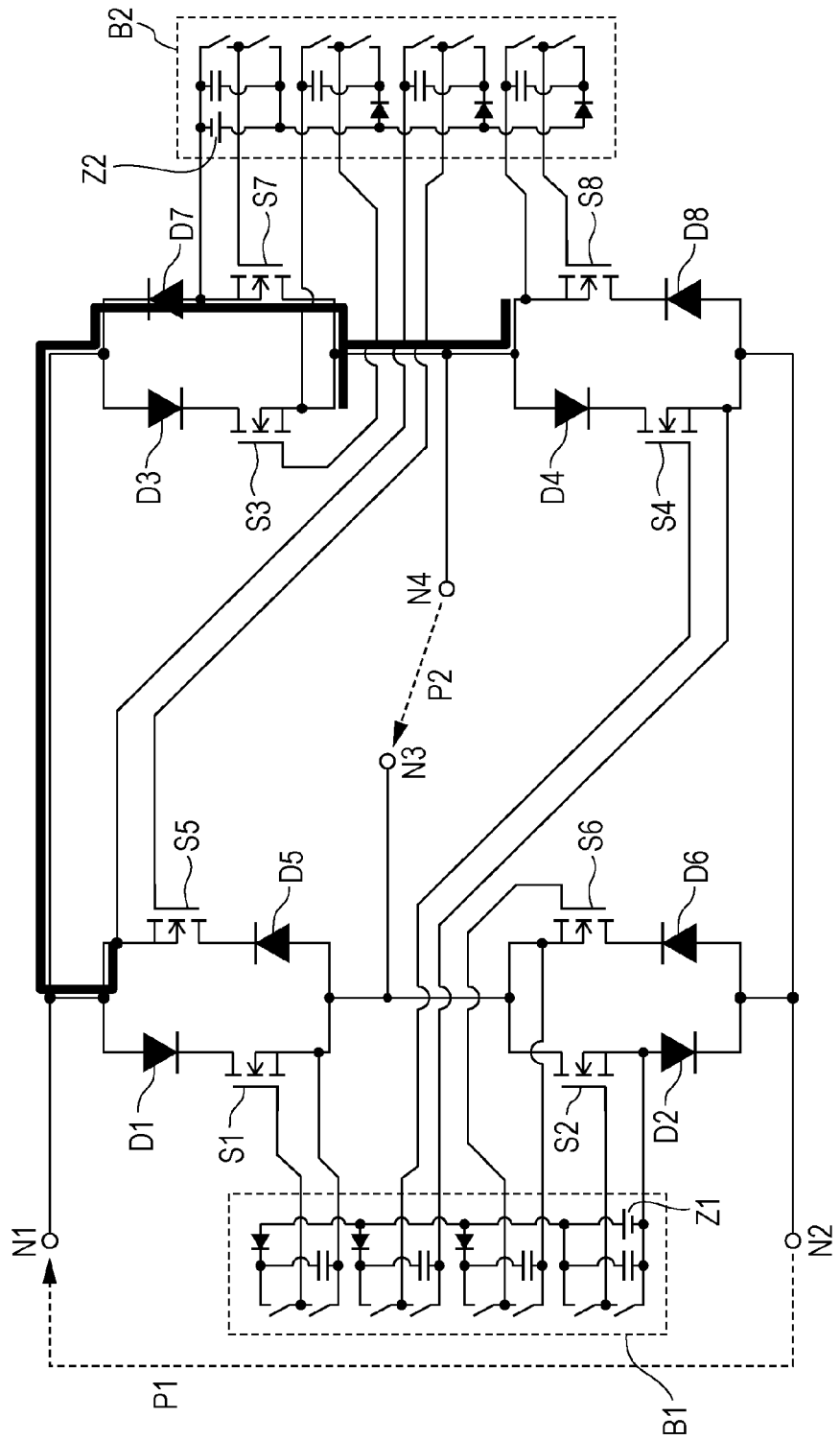
FIG. 12 illustrates a second conduction state in the electric power conversion circuit according to the first embodiment.

FIG. 12 illustrates a second conduction state of the electric power conversion circuit of FIG. 1. As illustrated in FIG. 12, when the seventh switch S7 is on, the sources of the third switch S3, the fifth switch S5, and the eighth switch S8 have electric potentials equal to the source of the seventh switch S7. Accordingly, the third switch S3, the fifth switch S5, the seventh switch S7, and the eighth switch S8 can be driven by the single bootstrap circuit B2 having four pairs of output terminals.

According to the above configuration, the eight switches S1 through S8 can be driven by the two isolated power sources Z1 and Z2. Since the number of isolated power sources is smaller than that in the comparative example of FIG. 20, it is possible to achieve a reduction in size and cost of the circuit.

Furthermore, the source of the seventh switch S7 that is directly connected to the negative electrode of the isolated power source Z2 is not directly connected to the first port terminal N1 and is connected to the first port terminal N1 via the seventh diode D7. This makes it possible to prevent the bootstrap circuit B2 from breaking down due to application of an input voltage (see FIG. 19) when a positive voltage is applied across the first port terminal N1 and the second port terminal N2. Similarly, the source of the second switch S2 that is directly connected to the negative electrode of the isolated power source Z1 is not directly connected to the second port terminal N2 and is connected to the second port terminal N2 via the second diode D2. This makes it possible to prevent the bootstrap circuit B1 from breaking down due to application of an input voltage (see FIG. 19) when a negative voltage is applied across the first port terminal N1 and the second port terminal N2.

Meanwhile, each of the sources of the other switches that are not directly connected to the negative electrodes of the isolated power sources Z1 and Z2 may be directly connected to a corresponding one of the port terminals N1 through N4 or may be connected to a corresponding one of the port terminals N1 through N4 via a corresponding diode. That is, the drain of the switch S1 may be connected to the port terminal N1 via the diode D1, or the source of the switch S1 may be connected to the port terminal N3 via the diode D1. The drain of the switch S3 may be connected to the port terminal N1 via the diode D3, or the source of the switch S3 may be connected to the port terminal N4 via the diode D3. The source of the switch S4 may be connected to the port terminal N2 via the diode D4, or the drain of the switch S4 may be connected to the port terminal N4 via the diode D4. The source of the switch S5 may be connected to the port terminal N1 via the diode D5, or the drain of the switch S5 may be connected to the port terminal N3 via the diode D5. The drain of the switch S6 may be connected to the port terminal N2 via the diode D6, or the source of the switch S6 may be connected to the port terminal N3 via the diode D6. The drain of the switch S8 may be connected to the port terminal N2 via the diode D8, or the source of the switch S8 may be connected to the port terminal N4 via the diode D8. The electric potentials of the sources of the switches S1, S4, and S6 can be made equal to that of the source of the switch S2 irrespective of the arrangement of the switches S1, S4, and S6 and the diodes D1, D4, and D6. Similarly, the electric potentials of the sources of the switches S3, S5, and S8 can be made equal to that of the source of the switch S7 irrespective of the arrangement of the switches S3, S5, and S8 and the diodes D3, D5, and D8.

In the electric power conversion circuit illustrated in FIG. 1, the diodes D1, D2, D3, D6, D7, and D8 are located not on the port terminal N3 or N4 side but on the port terminal N1 or N2 side relative to the switches S1, S2, S3, S6, S7, and S8, respectively. Meanwhile, only the diodes D4 and D5 are located not on the port terminal N1 or N2 side but on the port terminal N3 or N4 side relative to the switches S4 and S5, respectively. This makes it possible to reduce a fall of a gate voltage in the diode D4 and the diode D5 when the fourth switch S4 and the fifth switch S5 are driven.

For example, an operation mode in which all of the switches are on or off may be added to the operation modes of the electric power conversion circuit described above. For example, when a current-type generator is connected to the electric power conversion circuit, an operation mode in which all of the switches are on makes it possible to prevent the generator from being opened, thereby suppressing a rapid rise in voltage. When a voltage-type generator is connected to the electric power conversion circuit, an operation mode in which all of the switches are off makes it possible to prevent the generator from being short-circuited, thereby suppressing a rapid increase in electric current.

The switches S1 through S8 may be bipolar transistors such as IGBTs instead of N-channel MOSFETs. In this case, "drain" or "first terminal" of a switch in the description of this specification is replaced with "collector", and "source" or "second terminal" of a switch in the description of this specification is replaced with "emitter".

Figure 13:
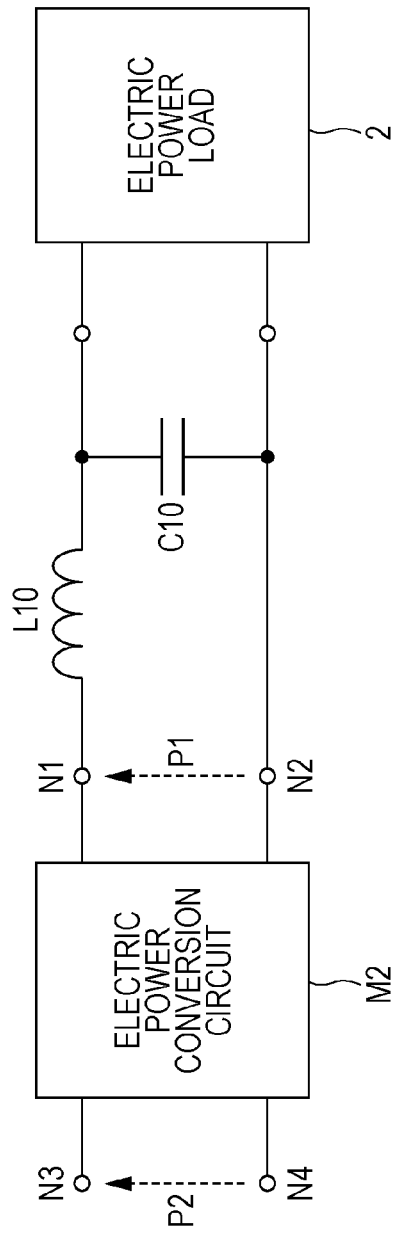
FIG. 13 illustrates an example of connection between the electric power conversion circuit according to the first embodiment and an electric power load.

FIG. 13 illustrates a connection example of the electric power conversion circuit illustrated in FIG. 1. An electric power conversion circuit M2 illustrated in FIG. 13 is the electric power conversion circuit illustrated in FIG. 1. The electric power conversion circuit described above may be used in combination with a reactor and a capacitor. For example, when electric power conversion circuit is connected to an electric power load 2 from the first port P1 via a reactor L10 and a capacitor C10 as illustrated in FIG. 13, it is possible to smooth an output electric current and an output voltage.

According to the electric power conversion circuit according to the first embodiment, it is possible to achieve bi-directional electric power conversion of direct-current electric power or alternating-current electric power by an electric power conversion circuit that is lower in cost and smaller in size than the conventional arts.

Second Embodiment

Figure 14:
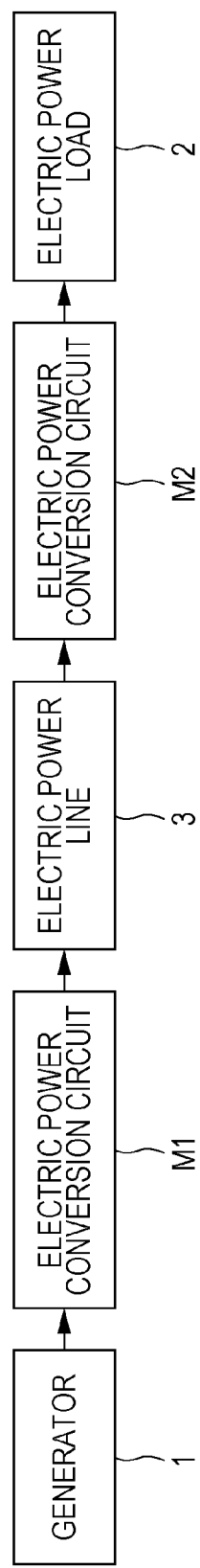
FIG. 14 is a block diagram illustrating an outline configuration of an electric power transmission system according to a second embodiment.

FIG. 14 is a block diagram illustrating an outline configuration of an electric power transmission system according to a second embodiment. The electric power transmission system illustrated in FIG. 14 includes at least one generator 1, which is a power source, at least one electric power load 2, which is a load, an electric power line 3, and electric power conversion circuits M1 and M2 according to the first embodiment. The electric power line 3 includes, for example, a wire for transmitting electric power. The electric power conversion circuit M1 is provided between a designated one of the at least one generator 1 and the electric power line 3 and is used as at least one electric power transmitting device. The electric power conversion circuit M2 is provided between the electric power line 3 and a designated one of the at least one load and is used as at least one electric power receiving device.

An identical code sequence is given to the electric power conversion circuit M1 used as an electric power transmitting device and the electric power conversion circuit M2 used as an electric power receiving device. The electric power conversion circuit M1 performs code modulation of electric power input from the generator 1 in accordance with the code sequence and then outputs the electric power to the electric power line 3. The electric power conversion circuit M2 performs code demodulation of the electric power input from the electric power line 3 in accordance with the code sequence and then outputs the electric power to the electric power load 2. In this way, it is possible to transmit electric power from the specific generator 1 to the specific electric power load 2. It is therefore possible to reduce the number of isolated power sources used in the electric power transmission system, thereby making it possible to introduce the electric power transmission system at low cost.

In the above embodiment, an example in which the electric power conversion circuit performs code modulation or code demodulation of electric power in accordance with a code sequence has been described. However, operation of the electric power conversion circuit is not limited to this. For example, the electric power conversion circuit may perform pulse width modulation of electric power in accordance with a PWM signal.

Overview of Embodiments

An electric power conversion circuit according to a first aspect includes first through fourth port terminals, first through eighth diodes, and first through eighth switches each of which has a first terminal, a second terminal, and a control terminal and is turned on or off in accordance with a control signal, the first diode and the first switch being connected in series between the first port terminal and the third port terminal so that an electric current flows from the first port terminal to the third port terminal in a case where the first switch is on, the second diode and the second switch being connected in series between the third port terminal and the second port terminal so that an electric current flows from the third port terminal to the second port terminal in a case where the second switch is on, the third diode and the third switch being connected in series between the first port terminal and the fourth port terminal so that an electric current flows from the first port terminal to the fourth port terminal in a case where the third switch is on, the fourth diode and the fourth switch being connected in series between the fourth port terminal and the second port terminal so that an electric current flows from the fourth port terminal to the second port terminal in a case where the fourth switch is on, the fifth diode and the fifth switch being connected in series between the third port terminal and the first port terminal so that an electric current flows from the third port terminal to the first port terminal in a case where the fifth switch is on, the sixth diode and the sixth switch being connected in series between the second port terminal and the third port terminal so that an electric current flows from the second port terminal to the third port terminal in a case where the sixth switch is on, the seventh diode and the seventh switch being connected in series between the fourth port terminal and the first port terminal so that an electric current flows from the fourth port terminal to the first port terminal in a case where the seventh switch is on, the eighth diode and the eighth switch being connected in series between the second port terminal and the fourth port terminal so that an electric current flows from the second port terminal to the fourth port terminal in a case where the eighth switch is on, each of the first through eighth switches being connected so that an electric current flows from the first terminal to the second terminal thereof in a case where the switch is on, the second switch being connected to the second port terminal via the second diode, the seventh switch being connected to the first port terminal via the seventh diode, the electric power conversion circuit further including a first voltage source, a first bootstrap circuit that applies a predetermined voltage to each of the control terminals of the first, second, fourth, and sixth switches in accordance with the control signal, a second voltage source, and a second bootstrap circuit that applies a predetermined voltage to each of the control terminals of the third, fifth, seventh, and eighth switches in accordance with the control signal.

In the electric power conversion circuit according to the first aspect, an electric power conversion circuit according to a second aspect is configured such that the second terminal of the second switch is connected to a negative electrode of the first voltage source, the first bootstrap circuit includes at least three first capacitors to which a voltage of the first voltage source is applied via at least three ninth diodes, the first bootstrap circuit applies a voltage of the first voltage source or the first capacitors based on an electric potential of the second terminal of each of the first, second, fourth, and the sixth switches to the control terminal of the switch in accordance with the control signal, the second terminal of the seventh switch is connected to a negative electrode of the second voltage source, the second bootstrap circuit includes at least three second capacitors to which a voltage of the second voltage source is applied via at least three tenth diodes, and the second bootstrap circuit applies a voltage of the second voltage source or the second capacitors based on an electric potential of the second terminal of each of the third, fifth, seventh, and eighth switches to the control terminal of the switch in accordance with the control signal.

In the electric power conversion circuit according to the first aspect or the second aspect, an electric power conversion circuit according to a third aspect is configured such that the first switch is connected to the first port terminal via the first diode, the third switch is connected to the first port terminal via the third diode, the fourth switch is connected to the fourth port terminal via the fourth diode, the fifth switch is connected to the third port terminal via the fifth diode, the sixth switch is connected to the second port terminal via the sixth diode, and the eighth switch is connected to the second port terminal via the eighth diode.

In the electric power conversion circuit according to one of the first through third aspects, an electric power conversion circuit according to a fourth aspect is configured such that the first through eighth switches are N-channel MOSFETs, the first terminal is a drain, and the second terminal is a source.

In the electric power conversion circuit according to one of the first through third aspects, an electric power conversion circuit according to a fifth aspect is configured such that the first through eighth switches are bipolar transistors, the first terminal is a collector, and the second terminal is an emitter.

In the electric power conversion circuit according to one of the first through fifth aspects, an electric power conversion circuit according to a sixth aspect is configured such that each of the first and second voltage sources is an isolated power source.

In the electric power conversion circuit according to one of the first through sixth aspects, an electric power conversion circuit according to a seventh aspect is configured such that the control signal is a predetermined code sequence, and the electric power conversion circuit performs code modulation or code demodulation of electric power input from the first and second port terminals in accordance with the code sequence and then outputs the electric power thus subjected to code modulation or code demodulation from the third and fourth port terminals.

In the electric power conversion circuit according to the seventh aspect, an electric power conversion circuit according to an eighth aspect is configured such that in a case where a positive electric current is input from the first port terminal, a state where the first and fourth switches are on and the second and third switches are off and a state where the first and fourth switches are off and the second and third switches are on are alternated, and in a case where a negative electric current is input from the first port terminal, a state where the fifth and eighth switches are on and the sixth and seventh switches are off and a state where the fifth and eighth switches are off and the sixth and seventh switches are on are alternated.

In the electric power conversion circuit according to one of the first through eighth aspects, an electric power conversion circuit according to a ninth aspect is configured such that the control signal is a predetermined code sequence, the electric power conversion circuit performs code modulation or code demodulation of electric power input from the third and fourth port terminals in accordance with the code sequence and then outputs the electric power thus subjected to code modulation or code demodulation from the first and second port terminals.

In the electric power conversion circuit according to the ninth aspect, an electric power conversion circuit according to a tenth aspect is configured such that in a case where a positive electric current is output from the first port terminal, a state where the fifth and eighth switches are on and the second and third switches are off and a state where the sixth and seventh switches are on and the first and fourth switches are off are alternated, and in a case where a negative electric current is output from the first port terminal, a state where the second and third switches are on and the fifth and eighth switches are off and a state where the first and fourth switches are on and the sixth and seventh switches are off are alternated.

An electric power transmission system according to an eleventh aspect includes at least one power source, at least one load, and an electric power line, the electric power transmission system further including a first electric power conversion circuit that is the electric power conversion circuit according to one of the seventh through tenth aspects that is provided between a designated one of the at least one power source and the electric power line and a second electric power conversion circuit that is the electric power conversion circuit according to one of the seventh through tenth aspects that is provided between the electric power line and a designated one of the at least one load, the first electric power conversion circuit performing code modulation of electric power input from the power source in accordance with the code sequence and then outputting the electric power to the electric power line, and the second electric power conversion circuit performing code demodulation of the electric power input from the electric power line in accordance with the code sequence and then outputting the electric power to the load, and thereby the electric power is transmitted from the designated power source to the designated load.

An electric power conversion circuit according to the present disclosure is useful for conversion of electric power in an alternating-current power source system or in a power source system using both direct-current and alternating-current. Furthermore, an electric power transmission system according to the present disclosure is useful for transmission of electric power from a generator such as a solar power generator, a wind power generator, or a hydropower generator to a railroad, an electric vehicle, or the like.

What is claimed is:
1. Electric power conversion circuitry comprising:
a first port terminal;
a second port terminal;
a third port terminal;
a fourth port terminal;
a first diode that allows a first electric current to flow from the first port terminal to the third port terminal;
a second diode that allows a second electric current to flow from the third port terminal to the second port terminal;
a third diode that allows a third electric current to flow from the first port terminal to the fourth port terminal;
a fourth diode that allows a fourth electric current to flow from the fourth port terminal to the second port terminal;
a fifth diode that allows a fifth electric current to flow from the third port terminal to the first port terminal;
a sixth diode that allows a sixth electric current to flow from the second port terminal to the third port terminal;
a seventh diode that allows a seventh electric current to flow from the fourth port terminal to the first port terminal;
an eighth diode that allows an eighth electric current to flow from the second port terminal to the fourth port terminal;
a first switch through which the first electric current flows when the first switch is on, the first switch including a first control terminal and being connected in series with the first diode;
a second switch through which the second electric current flows when the second switch is on, the second switch including a second control terminal and being connected in series with the second diode;
a third switch through which the third electric current flows when the third switch is on, the third switch including a third control terminal and being connected in series with the third diode;
a fourth switch through which the fourth electric current flows when the fourth switch is on, the fourth switch including a fourth control terminal and being connected in series with the fourth diode;
a fifth switch through which the fifth electric current flows when the fifth switch is on, the fifth switch including a fifth control terminal and being connected in series with the fifth diode;
a sixth switch through which the sixth electric current flows when the sixth switch is on, the sixth switch including a sixth control terminal and being connected in series with the sixth diode;
a seventh switch through which the seventh electric current flows when the seventh switch is on, the seventh switch including a seventh control terminal and being connected in series with the seventh diode;
an eighth switch through which the eighth electric current flows when the eighth switch is on, the eighth switch including an eighth control terminal and being connected in series with the eighth diode;
first bootstrap circuitry that includes a first voltage source and is connected to the first, second, fourth, and sixth control terminals; and
second bootstrap circuitry that includes a second voltage source and is connected to the third, fifth, seventh, and eighth control terminals.

2. The electric power conversion circuitry according to claim 1, wherein
the first bootstrap circuitry turns on or off the first, second, fourth, and sixth switches by applying first, second, fourth, and sixth control voltages to the first, second, fourth, and sixth control terminals, respectively; and
the second bootstrap circuitry turns on or off the third, fifth, seventh, and eighth switches by applying third, fifth, seventh, and eighth control voltages to the third, fifth, seventh, and eighth control terminals, respectively.

3. The electric power conversion circuitry according to claim 1, wherein
the second switch further includes a terminal that is connected to the third port terminal via the second diode or without the second diode and that is connected to a negative electrode of the first voltage source; and
the first bootstrap circuitry includes:
a first capacitor;
a second capacitor;
a third capacitor;
a ninth diode that is disposed on a first path extending from a positive electrode of the first voltage source to the negative electrode of the first voltage source via the first capacitor;
a tenth diode that is disposed on a second path extending from the positive electrode of the first voltage source to the negative electrode of the first voltage source via the second capacitor; and
an eleventh diode that is disposed on a third path extending from the positive electrode of the first voltage source to the negative electrode of the first voltage source via the third capacitor.

4. The electric power conversion circuitry according to claim 3, wherein
each of the first, second, fourth, and sixth control voltages is generated from at least one selected from a first power source voltage of the first voltage source, a first charge voltage charged in the first capacitor, a second charge voltage charged in the second capacitor, and a third charge voltage charged in the third capacitor.

5. The electric power conversion circuitry according to claim 3, wherein
the seventh switch further includes a terminal that is connected to the first port terminal via the seventh diode or without the seventh diode and that is connected to a negative electrode of the second voltage source; and
the second bootstrap circuitry includes:
a fourth capacitor;
a fifth capacitor;
a sixth capacitor;
a twelfth diode that is disposed on a fourth path extending from a positive electrode of the second voltage source to the negative electrode of the second voltage source via the fourth capacitor;
a thirteenth diode that is disposed on a fifth path extending from the positive electrode of the second voltage source to the negative electrode of the second voltage source via the fifth capacitor; and
a fourteenth diode that is disposed on a sixth path extending from the positive terminal of the second voltage source to the negative terminal of the second voltage source via the sixth capacitor.

6. The electric power conversion circuitry according to claim 5, wherein
each of the third, fifth, seventh, and eighth control voltages is generated from at least one selected from a second power source voltage of the second voltage source, a fourth charge voltage charged in the fourth capacitor, a fifth charge voltage charged in the fifth capacitor, and a sixth charge voltage charged in the sixth capacitor.

7. The electric power conversion circuitry according to claim 6, wherein
the first diode includes a first anode and a first cathode, and the first anode is connected to the first port terminal;
the second diode includes a second anode and a second cathode, and the second cathode is connected to the second port terminal;
the third diode includes a third anode and a third cathode, and the third anode is connected to the first port terminal;
the fourth diode includes a fourth anode and the fourth cathode, and the fourth anode is connected to the fourth port terminal;
the fifth diode includes a fifth anode and a fifth cathode, and the fifth anode is connected to the third port terminal;
the sixth diode includes a sixth anode and a sixth cathode, and the sixth anode is connected to the second port terminal;
the seventh diode includes a seventh anode and a seventh cathode, and the seventh cathode is connected to the first port terminal;
the eighth diode includes an eighth anode and an eighth cathode, and the eighth anode is connected to the second port terminal;

the first switch is connected between the first cathode and the third port terminal;
the second switch is connected between the third port terminal and the second anode;
the third switch is connected between the third cathode and the fourth port terminal;
the fourth switch is connected between the fourth cathode and the second port terminal;
the fifth switch is connected between the first port terminal and the fifth cathode;
the sixth switch is connected between the third port terminal and the sixth cathode;
the seventh switch is connected between the seventh anode and the fourth port terminal; and
the eighth switch is connected between the fourth port terminal and the eighth cathode.

8. The electric power conversion circuitry according to claim 7, wherein
each of the first and third paths passes through the second switch;
the second path passes through the second diode; and
the first voltage source, when the second switch is on, applies the first power source voltage to the first capacitor through the first path, applies the first power source voltage to the second capacitor through the second path, and applies the first power source voltage to the third capacitor through the third path.

9. The electric power conversion circuitry according to claim 8, wherein
each of the fourth and sixth paths passes through the seventh switch;
the fifth path passes through the seventh diode; and
the second voltage source, when the seventh switch is on, applies the second power source voltage to the fourth capacitor through the fourth path, applies the second power source voltage to the fifth capacitor through the fifth path, and applies the second power source voltage to the sixth capacitor through the sixth path.

10. The electric power conversion circuitry according to claim 1, wherein
each of the first through eighth switches is an N-channel MOSFET or a bipolar transistor.

11. The electric power conversion circuitry according to claim 1, wherein
each of the first and second voltage sources is an isolated power source.

12. The electric power conversion circuitry according to claim 2, wherein
the first through eighth control voltages change in accordance with first through eighth code sequences, respectively; and
the first through eighth switches, based on the first through eighth code sequences, code-modulate or code-demodulate power input from the first and second port terminals to output the code-modulated or code-demodulated power to the third and fourth port terminals.

13. The electric power conversion circuitry according to claim 12, wherein
when a positive electric current is input to the first port terminal on basis of the second port terminal, the first bootstrap circuitry switches between a first state where the first and fourth switches are on and the second and third switches are off and a second state where the first and fourth switches are off and the second and third switches are on; and
when a negative electric current is input to the first port terminal on basis of the second port terminal, the second bootstrap circuitry switches between a third state where the fifth and eighth switches are on and the sixth and seventh switches are off and a fourth state where the fifth and eighth switches are off and the sixth and seventh switches are on.

14. The electric power conversion circuitry according to claim 2, wherein
the first through eighth control voltages change in accordance with first through eighth code sequences, respectively; and
the first through eighth switches, based on the first through eighth code sequences, code-modulate or code-demodulate power input from the third and fourth port terminals to output the code-modulated or code-demodulated power to the first and second port terminals.

15. The electric power conversion circuitry according to claim 14, wherein
when a negative electric current is output from the first port terminal on basis of the second port terminal, the first bootstrap circuitry switches between a first state where the first and fourth switches are on and the second and third switches are off and a second state where the first and fourth switches are off and the second and third switches are on; and
when a positive electric current is output from the first port terminal on basis of the second port terminal, the second bootstrap circuitry switches between a third state where the fifth and eighth switches are on and the sixth and seventh switches are off and a fourth state where the fifth and eighth switches are off and the sixth and seventh switches are on.

16. An electric power transmission system comprising:
a power source;
first electric power conversion circuitry;
an electric power transmission path;
second electric power conversion circuitry; and
a load,
wherein each of the first and second electric power conversion circuitry is the electric power conversion circuitry according to claim 12,
the first electric power conversion circuitry code-modulates power input from the power source to output the code-modulated power to the electric power transmission path, and
the second electric power conversion circuitry code-demodulates the code-modulated power to output the code-demodulated power to the load.

* * * * *